US010062209B2

(12) United States Patent
Suzuki et al.

(10) Patent No.: US 10,062,209 B2
(45) Date of Patent: Aug. 28, 2018

(54) DISPLAYING AN OBJECT IN A PANORAMIC IMAGE BASED UPON A LINE-OF-SIGHT DIRECTION

(71) Applicant: NINTENDO CO., LTD., Kyoto (JP)

(72) Inventors: Toshiaki Suzuki, Kyoto (JP); Rory Johnson, Redmond, WA (US)

(73) Assignee: NINTENDO CO., LTD., Kyoto (JP)

( * ) Notice: Subject to any disclaimer, the term of this patent is extended or adjusted under 35 U.S.C. 154(b) by 267 days.

(21) Appl. No.: 13/875,436

(22) Filed: May 2, 2013

(65) Prior Publication Data
US 2014/0327666 A1 Nov. 6, 2014

(51) Int. Cl.
*G06T 19/00* (2011.01)

(52) U.S. Cl.
CPC .................. *G06T 19/006* (2013.01)

(58) Field of Classification Search
None
See application file for complete search history.

(56) References Cited

U.S. PATENT DOCUMENTS

| | | | | |
|---|---|---|---|---|
| 6,700,578 B2* | 3/2004 | Kamata et al. | ............... | 345/473 |
| 2008/0092110 A1* | 4/2008 | Kawahara et al. | ............ | 717/105 |
| 2008/0292213 A1* | 11/2008 | Chau | ............................ | 382/294 |
| 2010/0161658 A1* | 6/2010 | Hamynen et al. | ............ | 707/770 |
| 2012/0086728 A1* | 4/2012 | McArdle | ................. | G06F 3/017 |
| | | | | 345/633 |

FOREIGN PATENT DOCUMENTS

JP H10333557 12/1998

OTHER PUBLICATIONS

"Bing Maps Streetside Innovations", uploaded Feb. 17, 2010, accessed May 5, 2015, accessed from the internet <URL: https://www.youtube.com/watch?v=pgPkmzjCFM0>, 00:01-02:35.*
Google ("Google Street View Tutorial", uploaded Feb. 27, 2010, accessed Jan. 27, 2016 from internet URL: https://www.youtube.com/watch?v=uDGQEBIsw-c with time duration 00:01-9:54).*
"Google Maps Street View 'Explore the World at Street Level'", [online], retrieved Apr. 2, 2013, URL: http://maps.google.com/intl/en/help/maps/streetview/.

(Continued)

*Primary Examiner* — William A Beutel
(74) *Attorney, Agent, or Firm* — Lee & Hayes, PLLC

(57) ABSTRACT

An example of a display control system displays, on a display device, an image of a three-dimensional space representing a real world or a virtual world. The object is arranged in the three-dimensional space on the basis of a line-of-sight direction determined in the three-dimensional space. In addition, an image in a field-of-view range, determined on the basis of the line-of-sight direction, of the three-dimensional space is displayed on the display device. The display control system arranges the object in either a first control mode in which the object is arranged on a reference plane set in the three-dimensional space or in an area near the reference plane or a second control mode in which the object is arranged away from the area. In addition, the display control system switches between the first control mode and the second control mode in accordance with the line-of-sight direction.

19 Claims, 17 Drawing Sheets

(56) References Cited

OTHER PUBLICATIONS

"StreetSide Dynamic Street-Level Imagery via Bing Maps 'Streetside'", [online], retrieved Apr. 26, 2013, URL: http://www.microsoft.com/maps/streetside.aspx.

Notice of Reasons for Refusal dated Mar. 22, 2017 by the Japan Patent Office in corresponding Japanese Patent Application No. 2013-103644, 2 pages.

* cited by examiner

DISPLAYING AN OBJECT IN A PANORAMIC IMAGE BASED UPON A LINE-OF-SIGHT DIRECTION

FIELD

The technology herein relates to a display control system, a display control apparatus, a storage medium having stored therein a display control program, and a display control method which change a line-of-sight direction and display an image of a three-dimensional space.

BACKGROUND AND SUMMARY

Conventionally, there is a technology in which using a panoramic image representing the real world, a line-of-sight direction is changed in accordance with an operation of a user and an image of the real space is displayed. In this case, an object (arrow) indicating the direction of a road in the real world is displayed so as to be superimposed on the panoramic image.

In the conventional art, in some cases, the object displayed so as to be superimposed on the panoramic image becomes invisible or becomes hard to see, thereby deteriorating the visibility of the object.

Therefore, the present application discloses a display control system, a display control apparatus, a storage medium having stored therein a display control program, and a display control method which allow for improvement of the visibility of an object displayed so as to be superimposed on an image representing a three-dimensional space, such as a panoramic image.

(1) An example of a display control system described in the present specification displays a panoramic image on a display device. The display control system includes a display control unit and an object display unit. The display control unit is configured to display, on the display device, a panoramic image in a field-of-view range determined on the basis of a line-of-sight direction of a virtual camera. The object display unit is configured to display an object on the panoramic image on the basis of the line-of-sight direction of the virtual camera. The object display unit displays the object in any of a plurality of control modes including a first control mode in which the object is arranged so as to be kept near a ground in the panoramic image regardless of change of the line-of-sight direction of the virtual camera and a second control mode in which the object is arranged away from the ground in the panoramic image, and switches between the first control mode and the second control mode in accordance with an extent to which the line-of-sight direction of the virtual camera is directed to the ground in the panoramic image.

According to the configuration of the above (1), switching between the first control mode in which the object is displayed so as to be arranged near the ground in the panoramic image and the second control mode in which the object is displayed so as to be arranged away from the ground is performed in accordance with the extent to which the line-of-sight direction is directed to the ground. According to this, even when it is impossible to display the object in the first control mode, it is possible to display the object by switching to the second control mode according to need. Thus, it is possible to improve the visibility of the object displayed together with the panoramic image.

(2) Another example of the display control system described in the present specification displays, on a display device, an image of a three-dimensional space representing a real world or a virtual world. The display control system includes an object arrangement unit and a display control unit. The object arrangement unit is configured to arrange an object in the three-dimensional space on the basis of a line-of-sight direction determined in the three-dimensional space. The display control unit is configured to display an image in a field-of-view range, determined on the basis of the line-of-sight direction, of the three-dimensional space on the display device. The object arrangement unit arranges the object in any of a plurality of control modes including a first control mode in which the object is arranged on a reference plane set in the three-dimensional space or in an area near the reference plane and a second control mode in which the object is arranged away from the area, and switches between the first control mode and the second control mode in accordance with the line-of-sight direction.

According to the configuration of the above (2), switching between the first control mode in which the object is arranged on the reference plane or in the area near the reference plane and the second control mode in which the object is arranged away from the area is performed in accordance with the line-of-sight direction. According to this, even when it is impossible to display the object in the first control mode, it is possible to display the object by switching to the second control mode according to need. Thus, it is possible to improve the visibility of the object.

(3) In the first control mode, the object arrangement unit may arrange the object such that the object is kept at a reference distance from the reference plane; and in the second control mode, the object arrangement unit may arrange the object such that the object is away from the reference plane by a distance longer than the reference distance.

The "reference distance" does not necessarily need to be a fixed value and may be variable in a range where the object is moved along the reference plane or in a range where the object is arranged near the reference plane. In other words, the phrase "arranges the object such that the object is kept at a reference distance from the reference plane" means to include a mode in which the object is arranged such that the distance from the reference plane to the object is constant, a mode in which the object is arranged such that the object moves along the reference plane with the distance from the reference plane to the object being changed, and a mode in which the object is arranged near the reference plane. In addition, the "reference distance" may be 0. In other words, the phrase "arranges the object such that the object is kept at a reference distance from the reference plane" means to include a mode in which the object is arranged on the reference plane.

According to the configuration of the above (3), in the first control mode, the object is arranged on the reference plane or so as to be kept at the reference distance from the reference plane; and in the second control mode, the object is arranged so as to be away from the reference plane by the distance longer than the reference distance. Therefore, similarly to the configuration of the above (1), even when it is impossible to display the object in the first control mode, it is possible to display the object in the second control mode. Thus, it is possible to improve the visibility of the object.

(4) In the first control mode, the object arrangement unit may arrange the object such that the object is kept at a reference distance from the reference plane, regardless of change of the line-of-sight direction.

According to the configuration of the above (4), in the first control mode, the object is arranged along the reference plane even when the line-of-sight direction is changed.

Thus, it is possible to present correspondence between the object and the reference plane in an easy-to-understand manner. For example, when the object indicates a direction and/or a position on the reference plane, it is possible to present the direction and/or the position in an easy-to-understand manner to the user.

(5) The object arrangement unit may switch a control mode from the first control mode to the second control mode such that the object is not outside the field-of-view range as a result of change of the line-of-sight direction in the first control mode.

It is noted that the configuration of the above (5) specifies that the object is displayed at a time of shift from the first control mode to the second control mode, but does not specify that the object is always displayed. For example, after shifting to the second control mode (e.g., by switching to another control mode different from the first control mode and the second control mode), the object may not be displayed. In addition, for example, due to a reason other than change of the line-of-sight direction (e.g., by display/non-display of the object being switched in accordance with an instruction from the user or automatically without an instruction from the user), the object may not be displayed.

According to the configuration of the above (5), when the object is about to be outside the field-of-view range in the first control mode, the control mode is switched to the second control mode. As a result, the object is kept at a position within the field-of-view range. Thus, even when it is impossible to display the object only in the first control mode, it is possible to display the object in the second control mode. In other words, according to the configuration of the above (5), it is possible to display the object at more chances, and thus it is possible to improve the visibility of the object. It is noted that the phrase "the object is outside the field-of-view range" means that the object is completely outside the field-of-view range, and a case where only a part of the object is included in the field-of-view range does not correspond to the phrase "the object is outside the field-of-view range".

(6) The object may indicate a direction in the real world or the virtual world represented by the three-dimensional space.

According to the configuration of the above (6), it is possible to present the direction in the real world or the virtual world represented by the three-dimensional space, in an easy-to-understand manner to the user by using the object.

(7) The display control system may further include an input reception unit configured to receive an input of designating the object displayed on the display device. In this case, in accordance with reception of the input of designating the object, the display control unit may change the image of the three-dimensional space such that a position of a viewpoint in the real world or the virtual world is moved in a direction associated with the designated object, and may display the changed image on the display device.

According to the configuration of the above (7), in accordance with the input of designating the object, the image of the three-dimensional space is changed such that the position of the viewpoint is moved. Therefore, the user is allowed to move the viewpoint in the displayed real world by designating the object, and thus is allowed to move the viewpoint with a simple operation. In addition, since the object is displayed with favorable visibility by the configuration of the above (2), an operation of designating the object becomes easy.

(8) In the second control mode, the object arrangement unit may arrange the object at a position included in the field-of-view range determined on the basis of the line-of-sight direction.

According to the configuration of the above (8), it is possible to more reliably display (at least a part of) the object in the second control mode.

(9) In the second control mode, the object arrangement unit may arrange the object such that a positional relation between the line-of-sight direction and the object is kept as a positional relation in the first control mode immediately before shifting to the second control mode.

According to the configuration of the above (9), in switching the control mode from the first control mode to the second control mode, the positional relation between the line-of-sight direction (a straight line extending from the viewpoint along the line-of-sight direction) and the object is kept between before and after the switching. Therefore, in switching the control mode from the first control mode to the second control mode, the displayed position of the object is kept, and thus it is possible to reduce a concern that the user loses sight of the object at the time of the switching. Thus, it is possible to improve the visibility of the object.

(10) In the first control mode, the object arrangement unit may arrange the object such that an attitude of the object corresponds to the reference plane; and in the second control mode, the object arrangement unit may arrange the object such that the attitude of the object corresponds to the line-of-sight direction.

According to the configuration of the above (10), by changing the method for controlling the attitude of the object between the first control mode and the second control mode, it is possible to display the object in each control mode such that the object is easily visible.

(11) In the first control mode, the object arrangement unit may move the object along the reference plane in accordance with the line-of-sight direction.

According to the configuration of the above (11), since the object is moved along the reference plane in accordance with the line-of-sight direction, correspondence between the object and the reference plane is presented in an easy-to-understand manner. For example, when the object indicates a direction and/or a position on the reference plane, it is possible to present the direction and/or the position in an easy-to-understand manner to the user.

(12) In the first control mode, the object arrangement unit may arrange the object at a position included in the field-of-view range determined on the basis of the line-of-sight direction.

According to the configuration of the above (12), it is possible to more reliably display (at least a part of) the object in the first control mode.

(13) The object arrangement unit may set a control mode at the first control mode when the line-of-sight direction is directed to an inside of a predetermined range on the reference plane, and may switch the control mode to the second control mode in accordance with deviation of the line-of-sight direction from the inside of the predetermined range.

It is noted that in the configuration of the above (13), the control mode is switched on the basis of whether the line-of-sight direction is directed to the inside of the predetermined range, but a method for determining whether the line-of-sight direction is directed to the inside of the predetermined range is arbitrary. This determination may be performed by using a straight line extending from the viewpoint along the line-of-sight direction, or may be performed by using other information determined on the basis of the line-of-sight direction (e.g., the displayed position of the object on the screen).

According to the configuration of the above (13), the control mode is set at the first control mode in a state where the line-of-sight direction is directed to the inside of the predetermined range on the reference plane, and the object is arranged on the reference plane or so as to be kept at the reference distance from the reference plane. In addition, in accordance with change of the line-of-sight direction to a state where the line-of-sight direction is deviated from the inside of the predetermined range, the control mode is switched to the second control mode, and the object is arranged away from the reference plane. According to this, when the line-of-sight direction is directed to the predetermined range on the reference plane, it is possible to arrange the object in such a manner that correspondence between the object and the reference plane is easily understood, and even when the line-of-sight direction deviates from the reference plane, it is possible to display the object.

(14) The object arrangement unit may switch between the first control mode and the second control mode in accordance with an extent to which the line-of-sight direction is directed to the reference plane.

According to the configuration of the above (14), it is possible to switch the control mode in accordance with the extent to which the line-of-sight direction is directed to the reference plane. According to this, for example, the control mode is set at the first control mode in a state where the line-of-sight direction is directed to the reference plane, and the object is arranged on the reference plane or near the reference plane. In addition, in accordance with change of the line-of-sight direction to a state where the line-of-sight direction is not directed to the reference plane, the control mode is switched to the second control mode, and the object is arranged away from the reference plane. According to this, when the line-of-sight direction is directed to the reference plane, it is possible to arrange the object in such a manner that correspondence between the object and the reference plane is easily understood, and even when the line-of-sight direction deviates from the reference plane, it is possible to display the object.

(15) The display control unit may further display, on the reference plane, an image representing a shadow of the object.

According to the configuration of the above (15), by the image representing the shadow, it is possible to cause the user to intuitively recognize the position of the object on the reference plane, and thus it is possible to present the position of the object in an easy-to-understand manner. In addition, by the image representing the shadow, it is possible to show the object as if the object existed in the real world or the virtual world represented by the three-dimensional space, and it is possible to present the object to the user without giving an uncomfortable feeling to the user.

(16) The reference plane may be set so as to correspond to a ground in the real world or the virtual world represented by the three-dimensional space.

According to the configuration of the above (16), in the first control mode, it is possible to display the object at a position corresponding to the ground in the real world or the virtual world.

(17) The display control system may include a portable input device. In addition, the display control system may further include a line-of-sight control unit configured to control the line-of-sight direction in accordance with an attitude of the input device.

According to the configuration of the above (17), the user is allowed to change the line-of-sight direction with an intuitive operation of changing the attitude of the input device.

It is noted that the present specification discloses an example of a display control apparatus that has the same function as that of the display control system in the above (1) to (17) (the input device in the above (16) may not be included). In addition, the present specification discloses an example of a computer-readable storage medium having stored therein a display control program that causes a computer of an information processing apparatus to operate as the same means as each unit in the above display control system. Furthermore, the present specification discloses an example of a display control method performed by the display control system in the above (1) to (17).

According to the above display control system, display control apparatus, display control program, and display control method, by switching a control method regarding the arrangement of the object in accordance with the line-of-sight direction, it is possible to increase the chances of displaying the object, and thus it is possible to improve the visibility of the object.

These and other objects, features, aspects and advantages of the technology herein will become more apparent from the following detailed description when taken in conjunction with the accompanying drawings.

DETAILED DESCRIPTION OF NON-LIMITING EXAMPLE EMBODIMENTS

[1. Configuration of Information Processing System]

Figure 1:
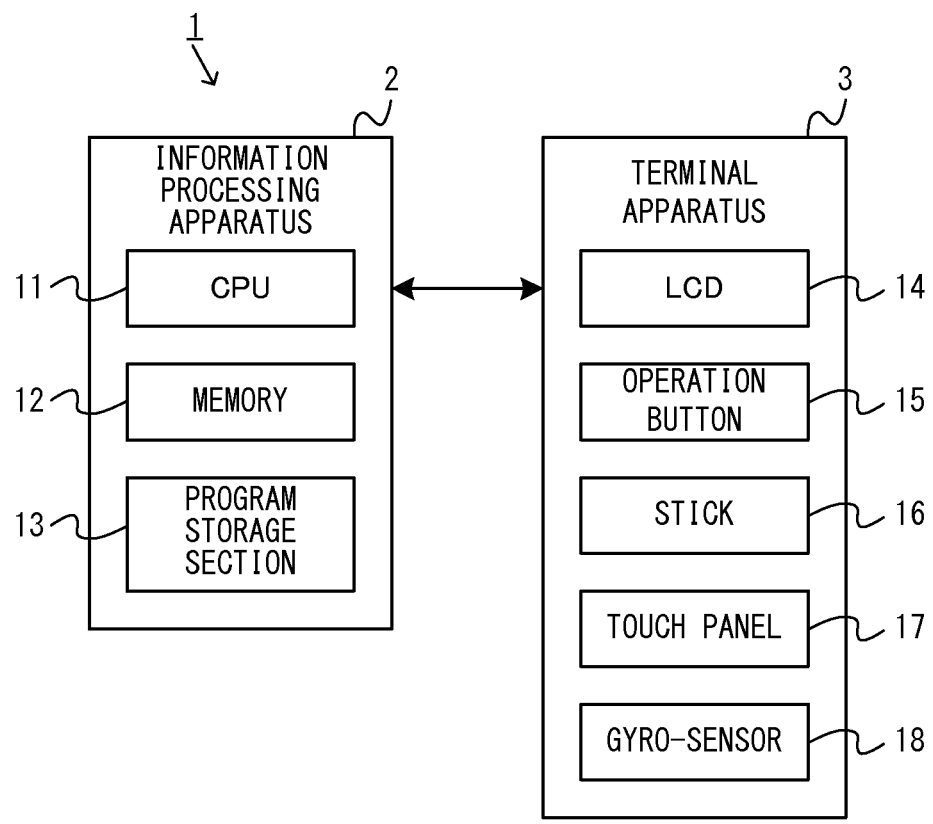
FIG. 1 is a block diagram showing an example of a non-limiting display control system according to an embodiment.

Hereinafter, a display control system, a display control apparatus, a display control program, and a display control method according to an example of an embodiment will be described. FIG. 1 is a block diagram showing an example of the display control system according to the present embodiment. In FIG. 1, an information processing system 1 that is the example of the display control system includes an information processing apparatus 2 and a terminal apparatus 3. The information processing system 1 according to the present embodiment displays, on a display device (the terminal apparatus 3), a panoramic image representing the real world.

The information processing system 1 includes the information processing apparatus 2 that is an example of the display control apparatus. The information processing apparatus 2 performs information processing performed in the information processing system 1, such as a display control process of displaying a panoramic image on the display device. The information processing apparatus 2 may be an information processing apparatus in any form such as a personal computer, a game apparatus, a handheld terminal, or a smart phone. The information processing apparatus 2 is able to communicate with the terminal apparatus 3. Communication between the information processing apparatus 2 and the terminal apparatus 3 may be performed via a wire or wirelessly.

As shown in FIG. 1, the information processing apparatus 2 includes a CPU 11, a memory 12, and a program storage section 13. The CPU 11 performs the display control process by executing a predetermined display control program using the memory 12. It is noted that the information processing apparatus 2 may have any configuration as long as the information processing apparatus 2 is able to perform the information processing, and, for example, a part or the entirety of the information processing may be performed by a dedicated circuit. In the present embodiment, the information processing apparatus 2 generates an image through the display control process, and the generated image is outputted from the information processing apparatus 2 to the terminal apparatus 3.

The program storage section 13 stores the display control program. The program storage section 13 is any storage device that is accessible to the CPU 11. The program storage section 13 may be a storage section included in the information processing apparatus 2, such as a hard disk, or may be a storage section attachable to and detachable from the information processing apparatus 2, such as an optical disc.

Figure 2:
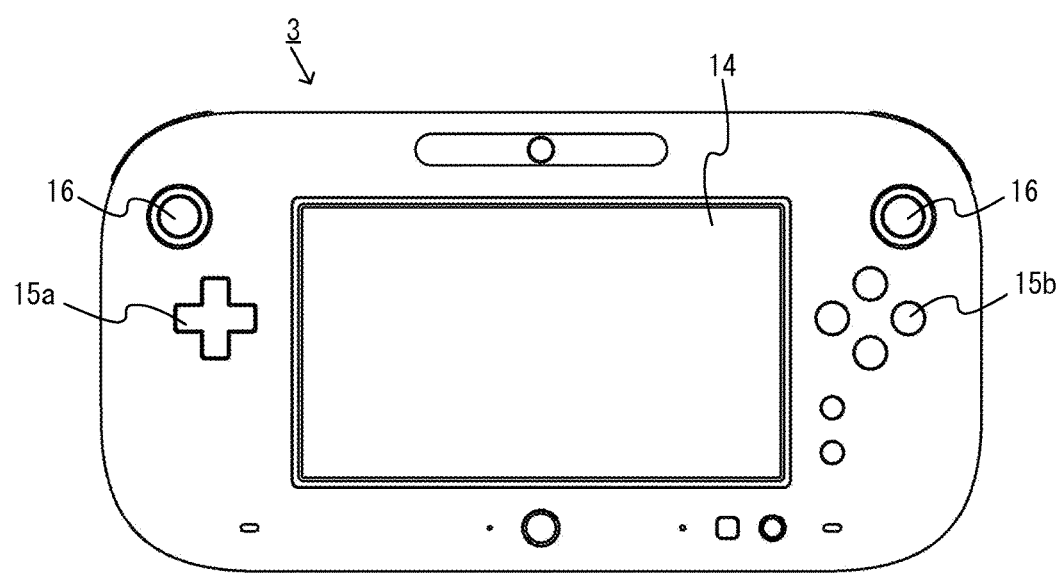
FIG. 2 is a diagram showing an example of the external structure of a non-limiting terminal apparatus.

The information processing system 1 includes the terminal apparatus 3. FIG. 2 is a diagram showing an example of the external structure of the terminal apparatus 3. The terminal apparatus 3 includes an LCD (liquid crystal display) 14 that is an example of a display unit. In other words, it can be said that the terminal apparatus 3 is a display device. In the present embodiment, the terminal apparatus 3 is a portable (or handheld) display device. The terminal apparatus 3 receives an image transmitted from the information processing apparatus 2 and displays the image on the LCD 14.

In addition, the terminal apparatus 3 includes an input section. The input section is any device that receives an operation of the user and generates operation data representing the operation of the user. In the present embodiment, the terminal apparatus 3 includes, as the input section, operation buttons 15, a stick 16, a touch panel 17, and a gyro-sensor 18. The operation buttons 15 are, for example, a cross button 15a and round buttons 15b shown in FIG. 2, but may be any types of buttons. The touch panel 17 is provided on the LCD 14. The stick 16 includes a movable member that is inclinable by the user, and detects and outputs an inclination amount and an inclination direction of the movable member. Furthermore, the gyro-sensor 18 is an example of an attitude sensor for calculating the attitude of the terminal apparatus 3. For example, in another embodiment, the terminal apparatus 3 may include an acceleration sensor and/or a magnetic sensor in addition to the gyro-sensor 18 (or instead of the gyro-sensor 18). Moreover, a method for calculating the attitude of the terminal apparatus 3 is arbitrary. For example, in another embodiment, the information processing apparatus 2 may capture an image of the terminal apparatus 3 with an imaging device and may calculate the attitude of the terminal apparatus 3 using the captured image.

The terminal apparatus 3 transmits, to the information processing apparatus 2, operation data generated by the input section. The operation data is repeatedly transmitted from the terminal apparatus 3 to the information processing apparatus 2, for example, every predetermined period of time. The information processing apparatus 2 performs the display control process using the operation data as an input.

In the information processing system 1, the information processing apparatus 2 performs information processing (the display control process) in accordance with an input on the terminal apparatus 3, and an image obtained as a result of the performing of the information processing is displayed on the terminal apparatus 3. As described above, in the present embodiment, the information processing system 1 is configured such that an input function, an information processing function, and a display function are realized by a plurality of apparatuses. It is noted that in another embodiment, the information processing system 1 may be composed of a single information processing apparatus having these functions (e.g., a handheld or portable information processing apparatus such as a handheld game apparatus, a mobile phone, a smart phone, a tablet type terminal, or a notebook personal computer, or a stationary information processing apparatus such as a desktop personal computer). In addition, in another embodiment, the function of the information processing apparatus 2 may be realized by a plurality of apparatuses. For example, in another embodiment, at least a part of the information processing performed by the information processing apparatus 2 may be distributed to and performed by a plurality of apparatuses that are able to perform communication via a network (a wide-area network and/or a local network).

Furthermore, in the present embodiment, the display device and the input device are configured so as to be integrated with each other as the terminal apparatus 3. However, in another embodiment, the display device and the input device may be provided as separate devices. For example, the information processing apparatus 2 may display an image on a display device (e.g., a television) different from the terminal apparatus 3.

[2. Display of Panoramic Image]

Next, the outline of a process of displaying an image in the present embodiment will be described. In the present embodiment, the information processing system 1 displays an image in a field-of-view range, corresponding to a line-of-sight direction operated by the user, of a panoramic image.

(Panoramic Image)

In the present embodiment, a panoramic image is an image whose range is wider than a range displayed on the display device. In other words, with regard to the panoramic image, an image in a part of the range of the panoramic image is basically displayed on the display device. In the present embodiment, of the panoramic image, a range included in a field-of-view range determined in accordance with the line-of-sight direction is a range displayed on the display device (a display range). It can also be said that the panoramic image is an image on which a process of determining a display range in accordance with a line-of-sight direction in a three-dimensional space is performed (when the panoramic image is displayed on the display device). The display range may be changed (moved), for example, in accordance with an operation of the user. In the case where the display range is moved, it can also be said that the panoramic image is an image for which a line-of-sight direction is changed by change of the display range. As described above, a part of the range of the panoramic image is normally displayed, but the information processing system 1 may have a function to display the entirety of the panoramic image on the display device. For example, in the case where a plurality of display devices are used in the information processing system 1, the entirety of the panoramic image may be displayed on some of the display devices.

It is noted that in the present embodiment, a panoramic image having a viewing angle in all directions (360°) with regard to the up, down, left, right directions is used. However, the panoramic image may include a dead angle, for example, its viewing angle may be about 180°, and an image whose range is wider than a range displayed on the display device (a field-of-view range) is a panoramic image.

In the present embodiment, panoramic images at a plurality of points in the real world are prepared. The information processing system 1 changes a panoramic image such that a point is moved in accordance with an operation of the user. For example, panoramic images at a plurality of points (see FIG. 16) along a road (street) in the real world may be prepared. In this case, by moving through the points while operating the line-of-sight direction, the user is allowed to see, with the display device, a view that is seen when actually walking along the street, and thus is allowed to obtain an experience as if actually walking along the street.

(Operation of Line-of-sight Direction)

Figure 3:
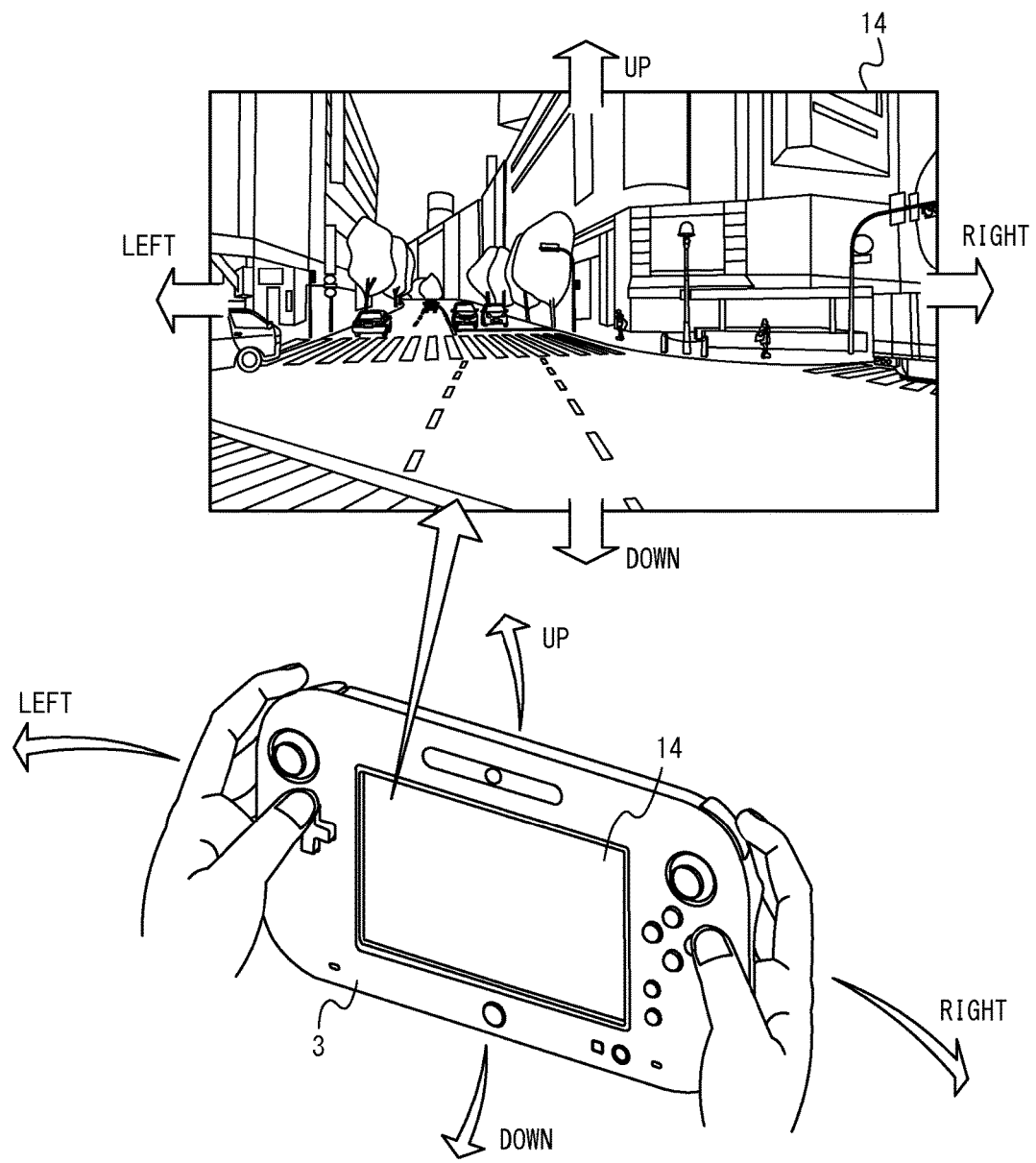
FIG. 3 is a diagram showing the non-limiting terminal apparatus and an example of an image displayed thereon.

FIG. 3 is a diagram showing the terminal apparatus 3 and an example of an image displayed thereon. As shown in FIG. 3, in the present embodiment, (a part of the range of) a panoramic image representing the real world is displayed on the LCD 14 of the terminal apparatus 3.

In the present embodiment, as shown in FIG. 3, the line-of-sight direction is controlled by an operation of the user changing the attitude of the terminal apparatus 3. For example, as shown in FIG. 3, when the terminal apparatus 3 is rotated up, down, left, or right, the line-of-sight direction for the image displayed on the LCD 14 is changed up, down, left, or right. In other words, the image displayed on the LCD 14 is scrolled up, down, left, or right, and a different range of the panoramic image is displayed. Specifically, the information processing system 1 calculates the attitude of the terminal apparatus 3 on the basis of an angular velocity detected by the gyro-sensor 18 and calculates the line-of-sight direction on the basis of the calculated attitude.

In this manner, the information processing system 1 controls the line-of-sight direction in accordance with the attitude of the terminal apparatus 3. According to this, the user is allowed to look over the panoramic image by performing an operation of changing the attitude of the terminal apparatus 3 so as to look over the surrounding, and thus is allowed to obtain an experience as if being actually at a location in the panoramic image. It is noted that in the present embodiment, the information processing system 1 causes a change amount of the attitude of the terminal apparatus 3 and a change amount of the line-of-sight direction for the panoramic image to agree with each other. By so doing, reality of the operation of changing the attitude of the terminal apparatus 3 is enhanced.

It is noted that in another embodiment, the control of the line-of-sight direction may be performed in any manner. In the case where the line-of-sight direction is controlled in accordance with an input of the user, a method for the input is arbitrary. The information processing system 1 may control the line-of-sight direction, for example, in accordance with an input on the cross button 15*a* or the stick 16. Alternatively, other than being controlled in accordance with an input of the user, the line-of-sight direction may be automatically controlled in accordance with a predetermined algorithm.

(Method for Displaying Panoramic Image)

In the present embodiment, the information processing system 1 sets a virtual three-dimensional space for displaying a panoramic image, and arranges a three-dimensional model in the three-dimensional space. Then, the information processing system 1 displays a panoramic image by a method in which a panoramic image is rendered as a texture on the three-dimensional model. A detailed description will be given below.

Figure 4:
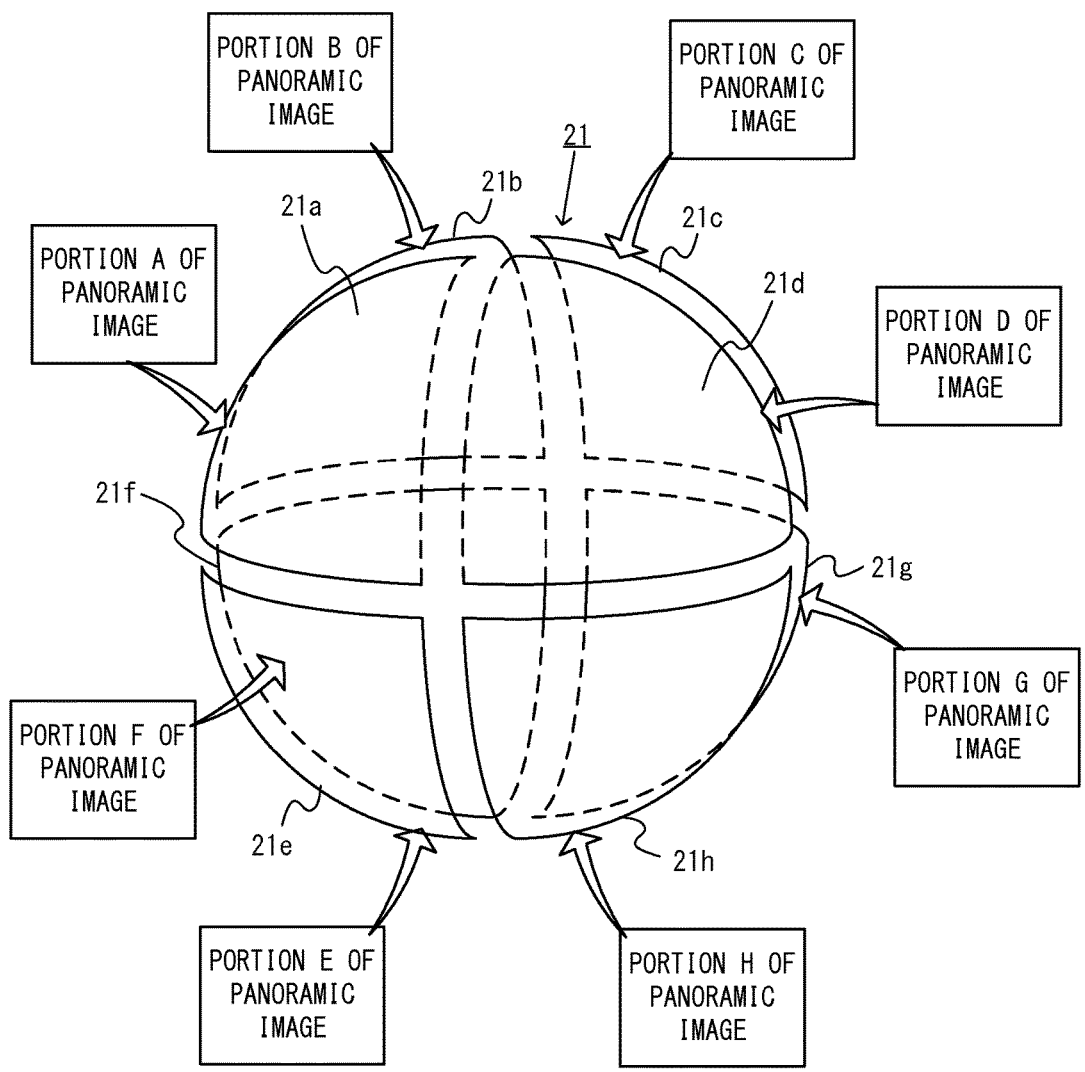
FIG. 4 is a diagram showing an example of a three-dimensional model arranged in a three-dimensional space.

FIG. 4 is a diagram showing an example of the three-dimensional model arranged in the three-dimensional space. As shown in FIG. 4, in the present embodiment, eight objects 21*a* to 21*h* are arranged in the three-dimensional space, as three-dimensional models for rendering a panoramic image. Each of the objects 21*a* to 21*h* has a curved surface shape that is a part of a spherical surface, and the objects 21*a* to 21*h* form a sphere when being combined with each other. As shown in FIG. 4, the eight objects 21*a* to 21*h* are spherically arranged.

On each of the objects 21*a* to 21*h*, a part of the panoramic image is rendered. Here, the panoramic image is divided in accordance with the number of the objects 21*a* to 21*h*. In the present embodiment, as shown in FIG. 4, the panoramic image is divided into eight portions A to H. Each portion of the divided panoramic image is rendered on an inner surface of the corresponding object. In the present embodiment, as shown in FIG. 4, each of the portions A to H of the divided panoramic image is rendered on an inner surface of the corresponding object (any of the objects 21*a* to 21*h*).

Figure 5:
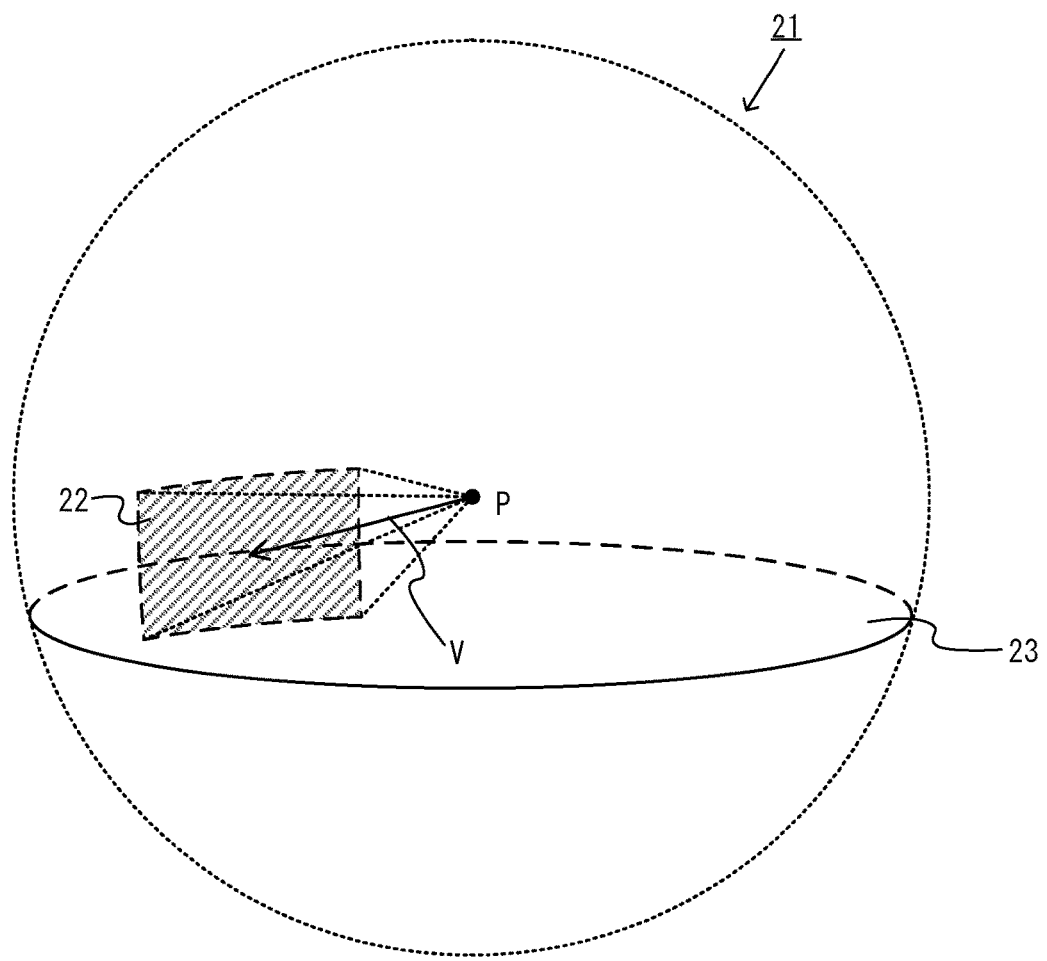
FIG. 5 is a diagram showing an example of a three-dimensional space set for displaying a panoramic image.

FIG. 5 is a diagram showing an example of the three-dimensional space set for displaying a panoramic image. It is noted that in the following, a model formed by the eight objects 21*a* to 21*h* being spherically arranged is referred to as a "three-dimensional model 21". In addition, in FIGS. 5 and 9 to 15, for the purpose of clarity of the drawings, the shape of each of the actually arranged objects 21*a* to 21*h* is not shown, and the external shape of the three-dimensional model 21 formed by the objects 21*a* to 21*h* is shown by a dotted line.

As described above, in order to display the panoramic image, the information processing system 1 sets the virtual three-dimensional space including the three-dimensional model 21. It is noted that in the present embodiment, a reference plane 23 is set in the three-dimensional space including the three-dimensional model 21 (see FIG. 5). The reference plane 23 will be described in detail later.

The information processing system 1 arranges a virtual camera inside the three-dimensional model 21. Here, as an example, the virtual camera is arranged at the center P of the three-dimensional model 21. In addition, as described above, a line-of-sight direction V of the virtual camera is determined in accordance with the attitude of the terminal apparatus 3. In the present embodiment, the position of the virtual camera is fixed. However, in another embodiment, the position of the virtual camera may be changed in accordance with the line-of-sight direction.

The information processing system 1 generates an image of the three-dimensional model 21 (the inner surface of the three-dimensional model 21) which is seen in the line-of-sight direction V from the position P of the virtual camera. In other words, the information processing system 1 generates an image in a field-of-view range, determined on the basis of the line-of-sight direction V (a shaded area 22 shown in FIG. 5), of the three-dimensional space (three-dimensional model 21), and displays the image on the display device. Here, in generating an image, the information processing system 1 renders a panoramic image as a texture on the inner surface of the three-dimensional model 21 as described above. In other words, a part of a panoramic image is rendered on the inner surface of the three-dimensional model 21 (some of the objects 21*a* to 21*h*) included in the field-of-view range, and the image in the field-of-view range is displayed. By so doing, of the panoramic image, an image in a range corresponding to the field-of-view range of the virtual camera is generated and displayed.

As described above, in the present embodiment, the line-of-sight direction V of the virtual camera is changed in accordance with an operation of the user. Accordingly, the field-of-view range of the virtual camera is changed in accordance with the operation of the user, and thus the display range corresponding to the field-of-view range is changed. In other words, the panoramic image displayed on the LCD 14 is scrolled in accordance with the operation of the user (see FIG. 3).

It is noted that the field-of-view range of the virtual camera is determined by any method based on the line-of-sight direction V. For example, the field-of-view range is determined so as to be a predetermined range having a center in the line-of-sight direction V. The information processing system 1 may change the size of the field-of-view range. In other words, the information processing system 1 may zoom in or out on the panoramic image displayed on the LCD 14. The size of the field-of-view range may be changed, for example, in accordance with an operation of the user.

[3. Arrangement of Direction Object]

Figure 6:
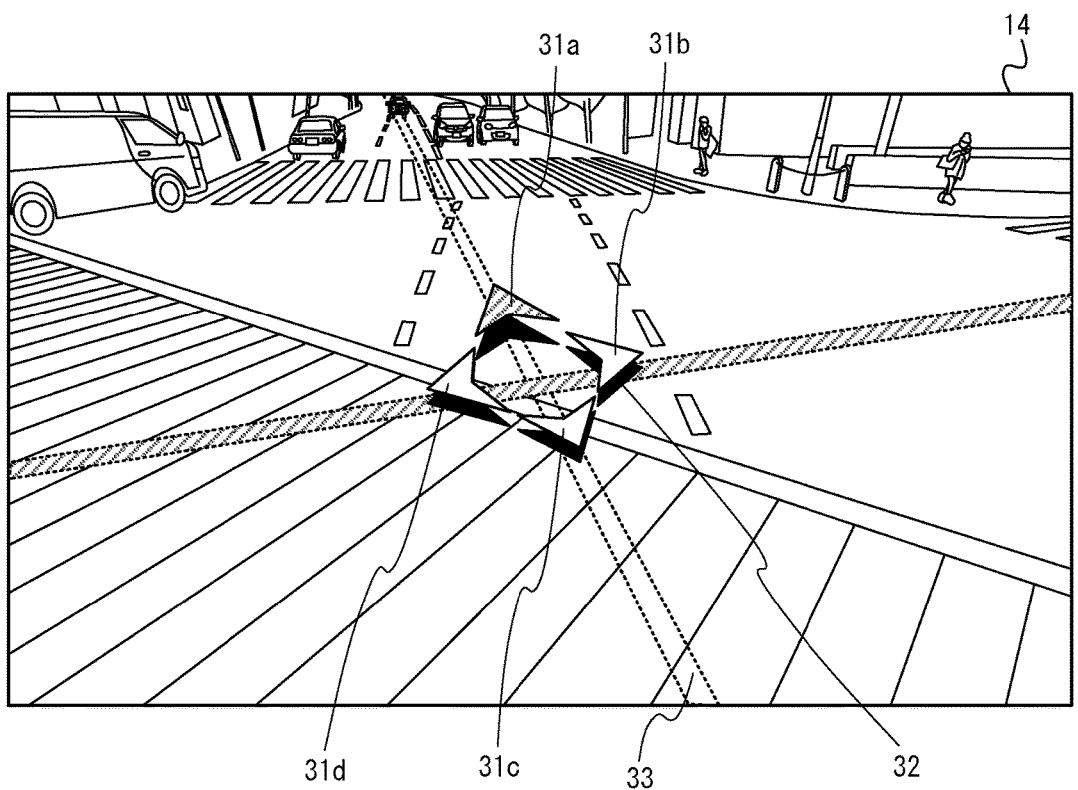
FIG. 6 is a diagram showing an example of an image displayed when a line-of-sight direction is directed to a ground (reference plane)
Figure 7:
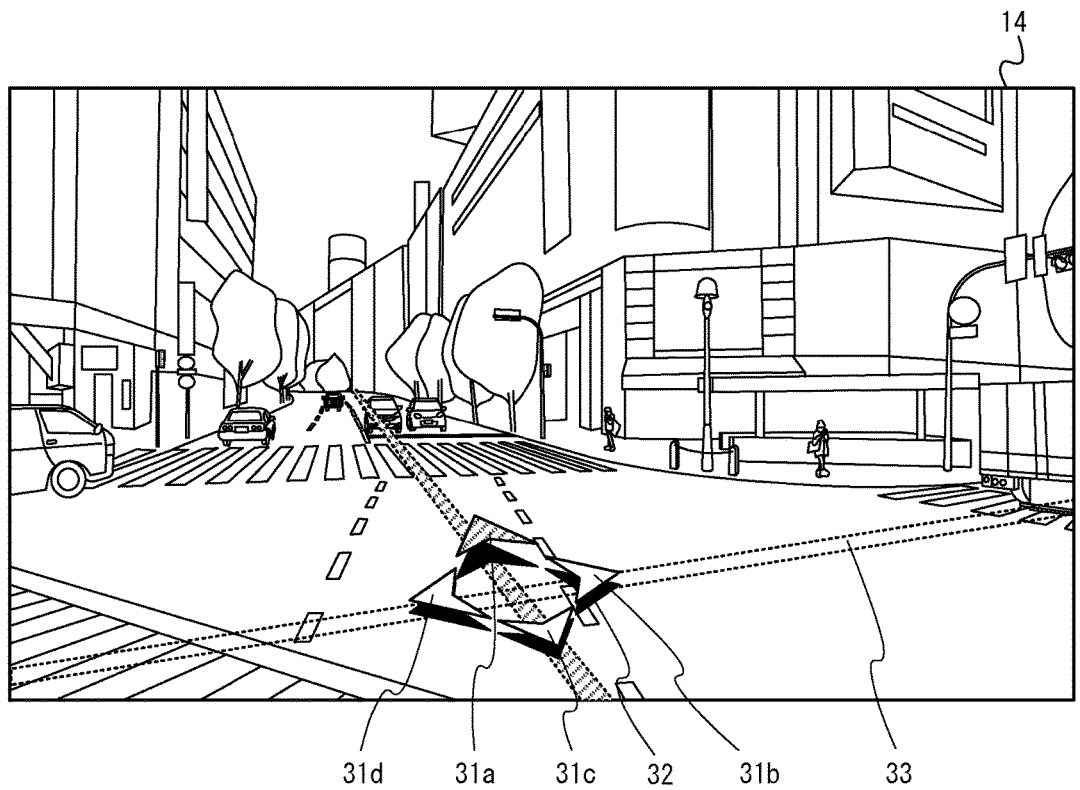
FIG. 7 is a diagram showing an example of an image displayed when the line-of-sight direction becomes close to the horizontal direction.
Figure 8:
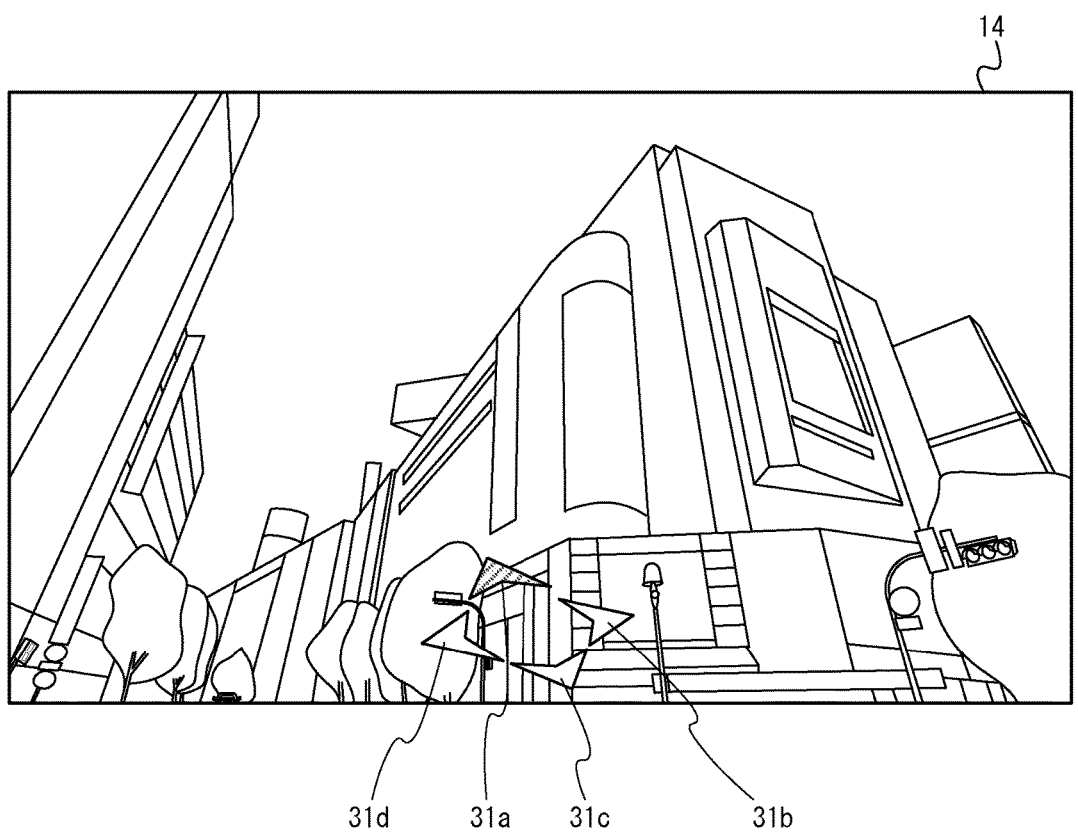
FIG. 8 is a diagram showing an example of an image displayed when the line-of-sight direction is directed upward with respect to the horizontal direction.

Next, a direction object that is arranged in the three-dimensional space in order that the direction object is displayed together with the panoramic image will be described with reference to FIGS. 6 to 15. FIGS. 6 to 8 are diagrams each showing an example of an image displayed on the display device in the present embodiment. As shown in FIGS. 6 to 8, direction objects 31 (four direction objects 31*a* to 31*d*) are displayed on the LCD 14 of the terminal apparatus 3 so as to be superimposed on a panoramic image representing the real world.

(3-1:Outline of Object Arrangement Control)

As shown in FIGS. 6 to 8, in the present embodiment, each direction object 31 indicates the direction of a road in the real world represented by the panoramic image. In other words, each direction object 31 is arranged in the above-described three-dimensional space so as to indicate a direction in the real world represented by the panoramic image. It is noted that in FIGS. 6 to 8, a panoramic image representing a situation obtained by seeing the surrounding from an intersection in the real world is displayed, the four direction objects 31*a* to 31*d* corresponding to four roads extending from the intersection are displayed. It is noted that the number of the arranged direction objects 31 is arbitrary, and may be set as appropriate, for example, in accordance with a content of the panoramic image (e.g., the number of roads included in the panoramic image). In addition, in the present embodiment, each direction object 31 has an arrowhead shape, but the shape and the color of each direction object 31 may be any shape and any color.

It is noted that in the present embodiment, as shown in FIGS. 6 to 8, shadow objects 32 representing shadows of the direction objects 31 and linear objects 33 corresponding to the roads are displayed together with the direction objects 31.

In addition, in the present embodiment, each direction object 31 has a function as an instruction image for performing an instruction to move a viewpoint. In other words, when an input of designating any direction object 31 is performed, the information processing system 1 performs a process of moving the viewpoint in the direction indicated by the designated direction object 31. This viewpoint movement process will be described in detail later.

In the present embodiment, each direction object 31 is arranged on the basis of the above-described line-of-sight direction. Although a detailed description will be given later, the information processing system 1 arranges each direction object 31 on the basis of line-of-sight direction such that each direction object 31 is included in the field-of-view range of the virtual camera.

In addition, in the present embodiment, the arrangement of each direction object 31 is controlled in two types of control modes, namely, a first control mode and a second control mode. The first control mode is a control mode in which each direction object 31 is arranged such that each direction object 31 is kept at a predetermined reference distance from the reference plane 23 (in another embodiment, each direction object 31 may be arranged on the reference plane 23) (see FIGS. 6 and 7). Here, in the present embodiment, the reference plane 23 is set so as to correspond to the ground in the real world. In other words, the reference plane 23 is arranged substantially horizontally in the three-dimensional space and is arranged at a position that substantially coincides with that of the ground in the real world. It is noted that the phrase "arranged at a position that substantially coincides with that of the ground in the real world" means that the reference plane 23 is not actually displayed but, if displayed, the reference plane 23 is displayed at such a position that the reference plane 23 is seen at substantially the same position as that of the ground in the real world. Therefore, in the first control mode, each direction object 31 is arranged so as to move along the ground in the real world. Meanwhile, the reference plane 23 may not be arranged at the position that substantially coincides with that of the ground in the real world, and may be arranged at a position away from the ground in the real world. In addition, the reference plane may have a certain degree of irregularities and distortions, and may not be an exact plane.

The second control mode is a control mode in which each direction object 31 is arranged away from the reference plane 23. In the second control mode, each direction object 31 is arranged so as to be more distant from the ground than in the first control mode (see FIG. 8).

In addition, the information processing system 1 switches the control mode in accordance with the line-of-sight direction. Hereinafter, a specific example of switching of the control mode will be described with reference to FIGS. 6 to 8.

FIG. 6 is a diagram showing an example of an image displayed when the line-of-sight direction is directed to the ground (reference plane 23). In FIG. 6, the line-of-sight direction is directed to the ground, and the ground is included in the entirety of the field-of-view range. In this case, the control mode is set at the first control mode, and each direction object 31 is arranged near the reference plane 23. Specifically, each direction object 31 is arranged at a position higher than the reference plane 23 by the predetermined reference distance. In the first control mode, each direction object 31 is arranged near the reference plane 23 (ground) in this manner, and thus correspondence between each direction object 31 and the ground is easily understood. Therefore, it is possible to present the direction on the reference plane 23 indicated by each direction object 31 in an easy-to-understand manner to the user. In other words, in the present embodiment, it is possible to present the direction of each road in an easy-to-understand manner to the user. In addition, in the state shown in FIG. 6, each direction object 31 is arranged at a position ahead of the line-of-sight direction from the position of the viewpoint, namely, at substantially the center of the screen.

FIG. 7 is a diagram showing an example of an image displayed when the line-of-sight direction becomes close to the horizontal direction. In FIG. 7, the line-of-sight direction becomes close to the horizontal direction from the state shown in FIG. 6, and the ground is included mostly in the lower half of the field-of-view range. In this case, the control mode is set at the first control mode, and each direction object 31 is arranged near the ground. Therefore, also in the state shown in FIG. 7, similarly to the state shown in FIG. 6, each direction object 31 is arranged at a position higher than the reference plane 23 by the reference distance.

In FIG. 7, each direction object 31 is displayed at a position lower than the center of the screen of the LCD 14. This is because, in the state shown in FIG. 7, if each direction object 31 is arranged so as to be displayed at the center of the screen (under the condition where each direction object 31 is arranged at a position higher than the reference plane 23 by the reference distance), the distance from the viewpoint to each direction object 31 is increased, resulting in that each direction object 31 becomes less visible. In other words, in the present embodiment, the information processing system 1 arranges each direction object 31 in a range within a predetermined distance from the viewpoint (a later-described arrangement range 34 shown in FIG. 11) in the first control mode (i.e., such that each direction object 31 is near the reference plane 23).

It is noted that as shown in FIGS. 6 and 7, in the first control mode, the information processing system 1 displays, on the reference plane 23, the shadow objects 32 representing the shadows of the direction objects 31. By so doing, it is possible to cause the user to intuitively recognize the position, on the reference plane 23, of each direction object 31, and it is possible to present the position of each direction object 31 in an easy-to-understand manner. In addition, it is possible to show each direction object 31 as if each direction object 31 existed in the real world, and thus it is possible to present each direction object 31 to the user without giving an uncomfortable feeling to the user. It is noted that each shadow may be displayed by a method in which a shadow is rendered on the basis of calculation using a light source. In addition, in another embodiment, when each direction object 31 is arranged on the reference plane 23, no shadow may be displayed.

Here, when the line-of-sight direction is directed further upward from the state shown in FIG. 7 (the user directs the terminal apparatus 3 further upward), the screen is scrolled further upward, resulting in that the ground is outside the screen. Therefore, if each direction object 31 is always arranged near the ground regardless the line-of-sight direction, when the line-of-sight direction is directed upward, each direction object 31, together with the ground, is outside the screen, and each direction object 31 is not displayed. For example, when the user directs the line-of-sight direction upward in order to see a tall building or the sky, the direction of the road indicated by each direction object 31 become unidentified.

Therefore, in the present embodiment, when each direction object 31 is about to be not displayed in the first control mode, the information processing system 1 switches the control mode to the second control mode. FIG. 8 is a diagram showing an example of an image displayed when the line-of-sight direction is directed upward with respect to the horizontal direction. In FIG. 8, the line-of-sight direction is directed upward, the ground is not included in the field-of-view range. In this case, the control mode is set at the second control mode, and each direction object 31 is arranged away from the ground. It is noted that in the present embodiment, the position of each direction object 31 on the screen in the second control mode is the position of each direction object 31 in the first control mode immediately before the control mode is switched, namely, a position on the lower side of the screen.

It is noted that as shown in FIG. 8, when the ground (reference plane 23) is not displayed in the second control mode, each shadow (shadow object 32) is not displayed. Therefore, the user is allowed to easily determine whether each direction object 31 is arranged near the reference plane 23 or away from the reference plane 23, on the basis of whether each shadow is displayed.

As described above, in the present embodiment, the information processing system 1 switches the control mode for controlling the arrangement of each direction object 31 between a plurality of control modes including the first control mode and the second control mode in accordance with the line-of-sight direction. According to this, even when it is impossible to display each direction object 31 in the first control mode, it is possible to display each direction object 31 by switching to the second control mode according to need. In other words, it is possible to increase the chances of each direction object 31 being displayed, and it is possible to enhance the visibility of each direction object 31. In addition, according to the above, it is possible to present each direction object 31 in the first control mode such that correspondence between each direction object 31 and the reference plane 23 is easily understood, and, for example, even when the reference plane 23 is not included in the field-of-view range in the second control mode, it is also possible to present the direction indicated by each direction object 31 to the user. For example, even when the user directs the line-of-sight direction upward as if looking up at a tall building as shown in FIG. 8, the user is allowed to recognize the direction of each road, since each direction object 31 is displayed. In addition, in the present embodiment, by designating any direction object 31, it is possible to move the viewpoint in the direction indicated by the designated direction object 31 (a detailed description will be given later). Thus, the user is allowed to move the viewpoint in a desired direction while keeping the line-of-sight direction upward.

(3-2:Specific Example of Object Arrangement Control)

Next, an example of a specific method for arranging each direction object 31 will be described with reference to FIGS. 9 to 15. It is noted that in the present embodiment, the direction objects 31 whose number corresponds to the number of the roads included in the panoramic image are arranged, but a case where a single direction object 31 is arranged will be described as an example in the description with reference to FIGS. 9 to 15.

(First Control Mode)

Figure 9:
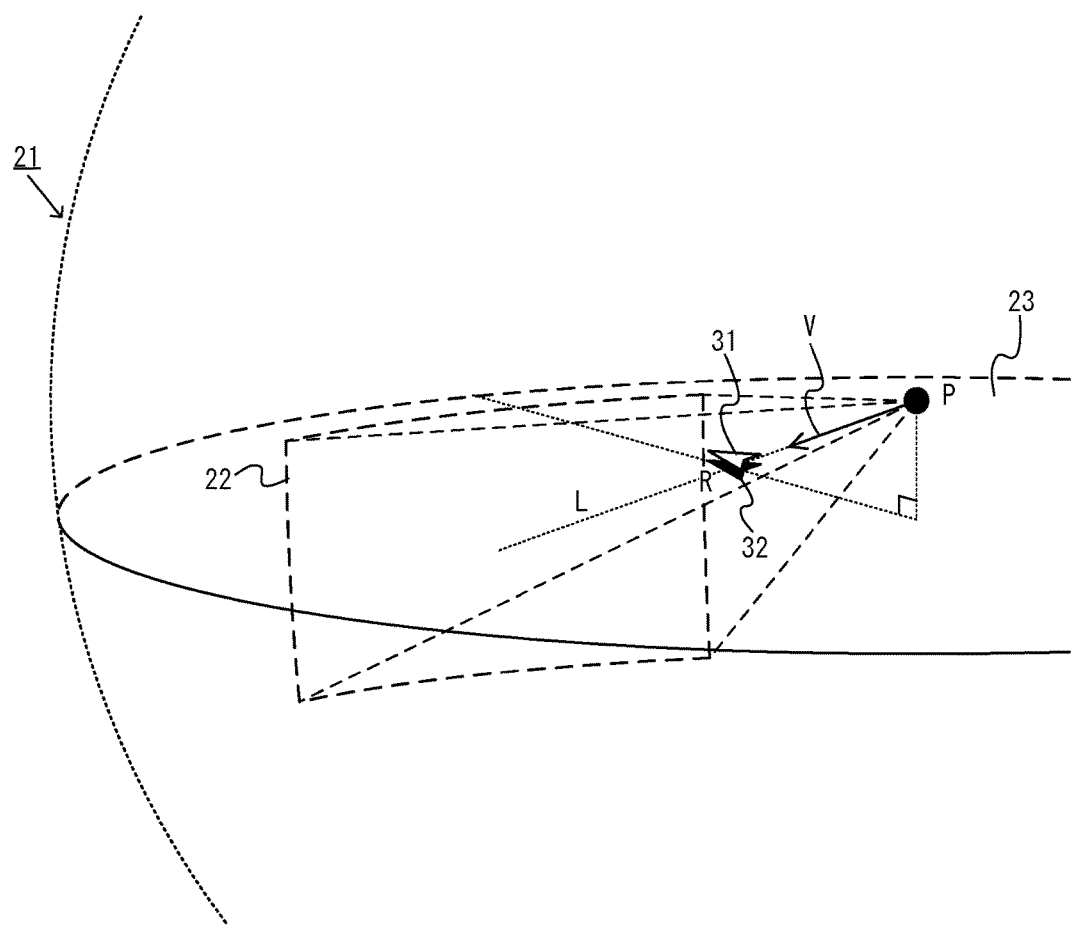
FIG. 9 is a diagram showing an example of the three-dimensional space when the line-of-sight direction is directed to the ground (reference plane)
Figure 10:
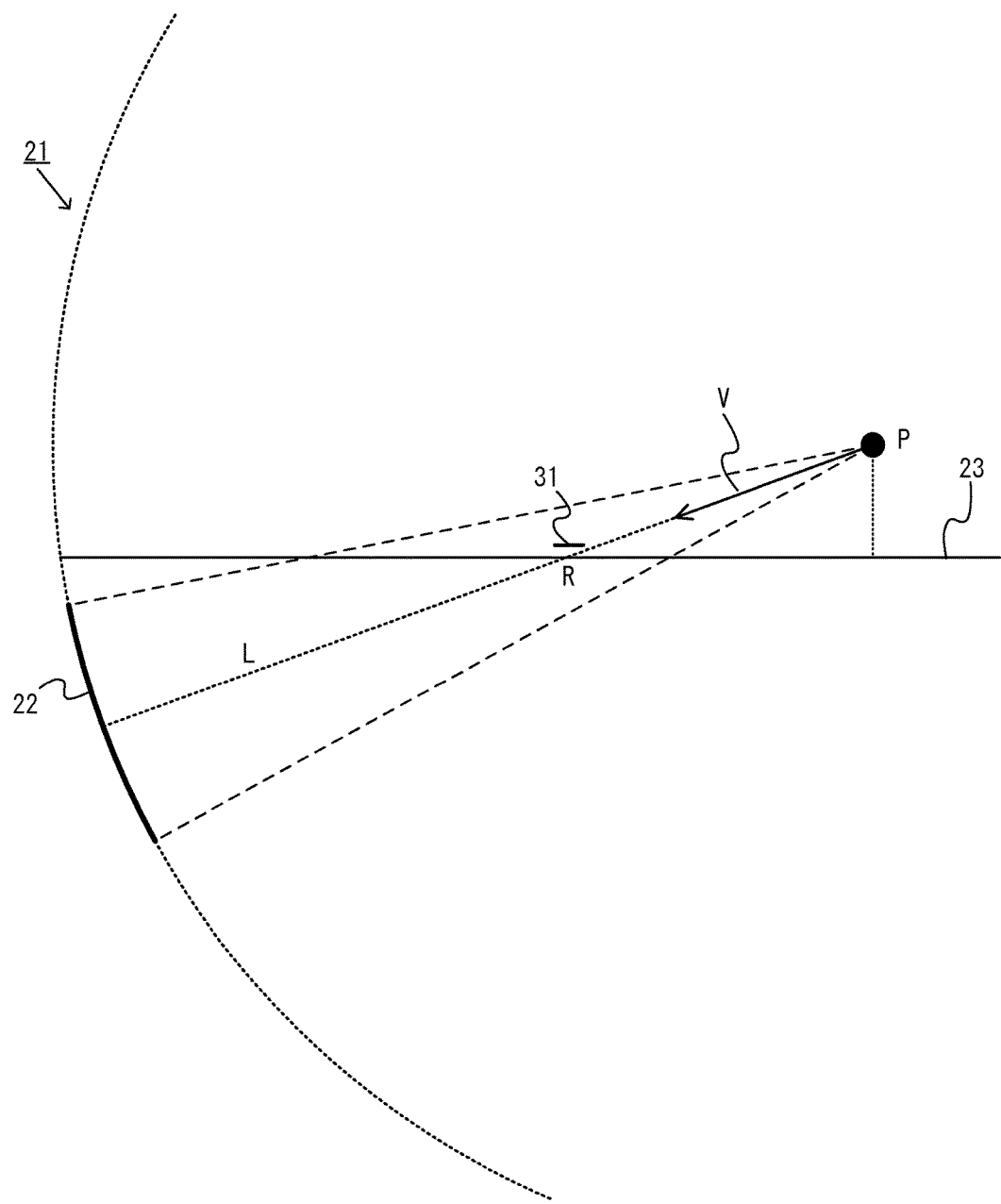
FIG. 10 is a diagram of the example of the three-dimensional space shown in FIG. 9, as seen from a direction parallel to the reference plane.

FIG. 9 is a diagram showing an example of the three-dimensional space when the line-of-sight direction V is directed to the ground (reference plane 23) (see FIG. 6). In addition, FIG. 10 is a diagram of the three-dimensional space shown in FIG. 9, as seen from a direction parallel to the reference plane 23. In the state shown in FIGS. 9 and 10, the line-of-sight direction V is directed to the ground, and the position P of the viewpoint is located above the reference plane 23, but the area 22, which is the field-of-view range, on the inner surface of the three-dimensional model 21 is located below the reference plane 23. In this case, the control mode is set at the first control mode as described above. In the first control mode, the information processing system 1 moves the direction object 31 along the reference plane 23 in accordance with the line-of-sight direction V. More specifically, the information processing system 1 arranges the shadow object 32 at a position of an intersection point R between a line-of-sight straight line L and the reference plane 23, and arranges the direction object 31 at a position higher than the intersection point R by the reference distance (see FIGS. 9 and 10). It is noted that the line-of-sight straight line L is a straight line extending from the position P of the viewpoint along the line-of-sight direction V. Due to the above, the direction object 31 is displayed near the center of the screen so as to move along the ground in accordance with the line-of-sight direction V (see FIG. 6). It is noted that since the reference plane 23 is not displayed, images of the direction object 31 (and the shadow object 32) and the area 22 within the field-of-view range of the inner surface of the three-dimensional model 21 are displayed.

In addition, a direction in the three-dimensional space is associated with the direction object 31, and the direction object 31 is arranged so as to indicate the direction. In the present embodiment, the above direction is a direction on the reference plane 23 (ground) (a direction parallel to the reference plane 23), and more specifically, the direction is a direction corresponding to the direction of a road in the real world (a detailed description will be given in "(3-3:Viewpoint movement process)" described later). In the present embodiment, the information processing system 1 arranges the direction object 31 such that the tip of the direction object 31 having an arrowhead shape is directed in the above direction. In addition, in the first control mode, the direction object 31 having a flat surface shape (plate shape) is arranged in such an attitude that the direction object 31 is substantially parallel to the reference plane 23 (see FIGS. 9 and 10). It is noted that in the first control mode, the attitude of the shadow object 32 is set in the same manner as for the direction object 31.

It is noted that although not shown in FIGS. 9 to 15, the linear object 33 is arranged on the reference plane 23 so as to correspond to the road in the present embodiment. Therefore, the direction of the linear object 33 is the same as the direction indicated by the direction object 31. A method for arranging the linear object 33 is the same in the first control mode and the second control mode.

Figure 11:
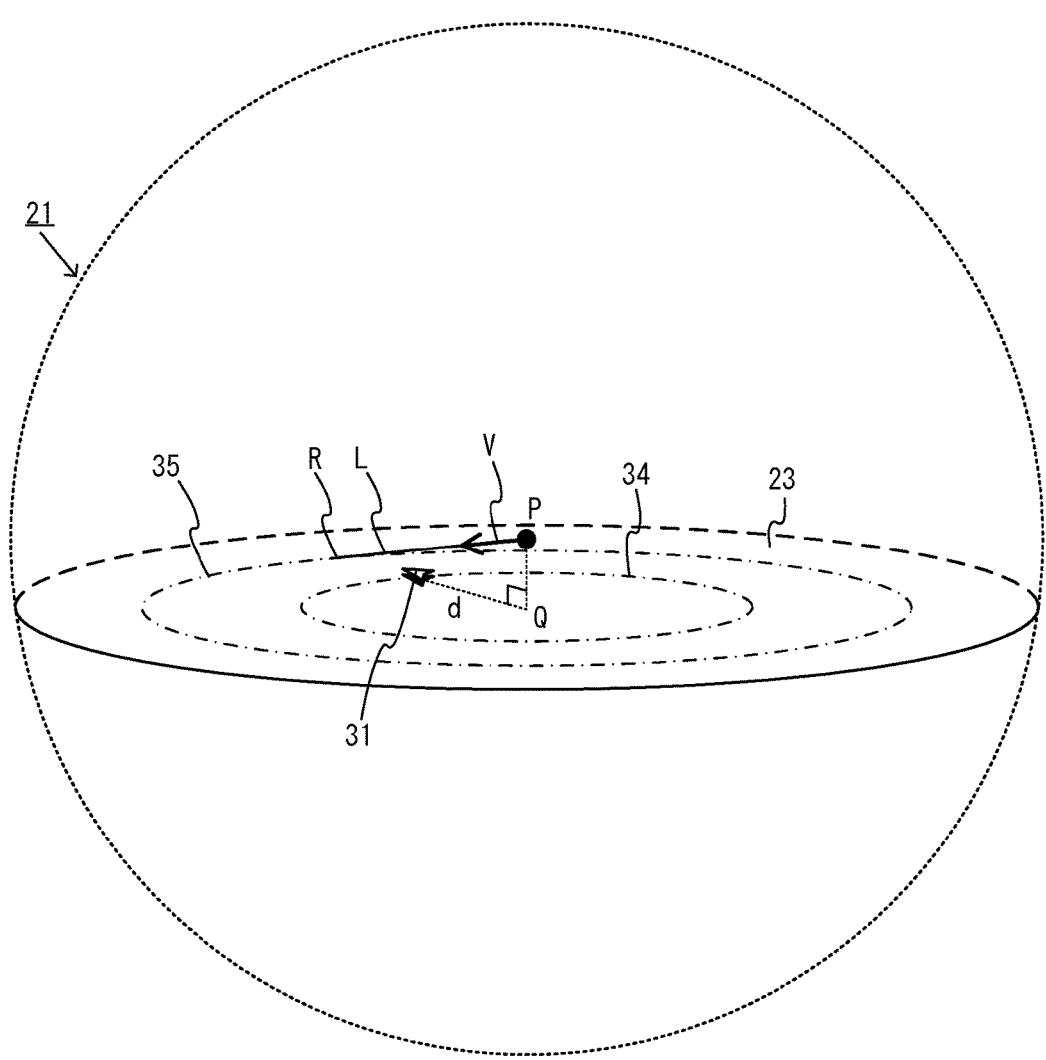
FIG. 11 is a diagram showing an example of an arrangement range of a direction object.

In the present embodiment, in the first control mode, the direction object 31 is arranged in the range where the distance from the viewpoint to the direction object 31 falls within the predetermined distance. FIG. 11 is a diagram showing an example of the arrangement range of the direction object 31. In the first control mode of the present embodiment, the direction object 31 is arranged such that its position on the reference plane 23 (a position at which the direction object 31 is projected onto the reference plane 23) falls within an arrangement range 34 shown in FIG. 11. In FIG. 11, the arrangement range 34 has a center at a position Q at which the viewpoint position P is projected onto the reference plane 23 (a projected position), and has a circular shape with a radius d. It is noted that the projected position Q is the position of an intersection point between the reference plane 23 and a perpendicular from the viewpoint position P to the reference plane 23. In addition, the shape and the size of the arrangement range 34 are arbitrary. For example, in another embodiment, the entirety of the reference plane 23 within the three-dimensional model 21 may be set as the arrangement range 34.

In the present embodiment, when the line-of-sight direction V is directed to the arrangement range 34 (when the line-of-sight straight line L and the arrangement range 34 intersect each other), the direction object 31 is arranged above the intersection point R as shown in FIGS. 9 and 10. On the other hand, in the first control mode, when the line-of-sight direction V is not directed to the arrangement range 34 (when the line-of-sight straight line L and the arrangement range 34 do not intersect each other), the direction object 31 is not arranged above the intersection point R, and is arranged above the arrangement range 34 (see FIGS. 11 to 13). Specifically, the direction object 31 is arranged as follows.

Figure 12:
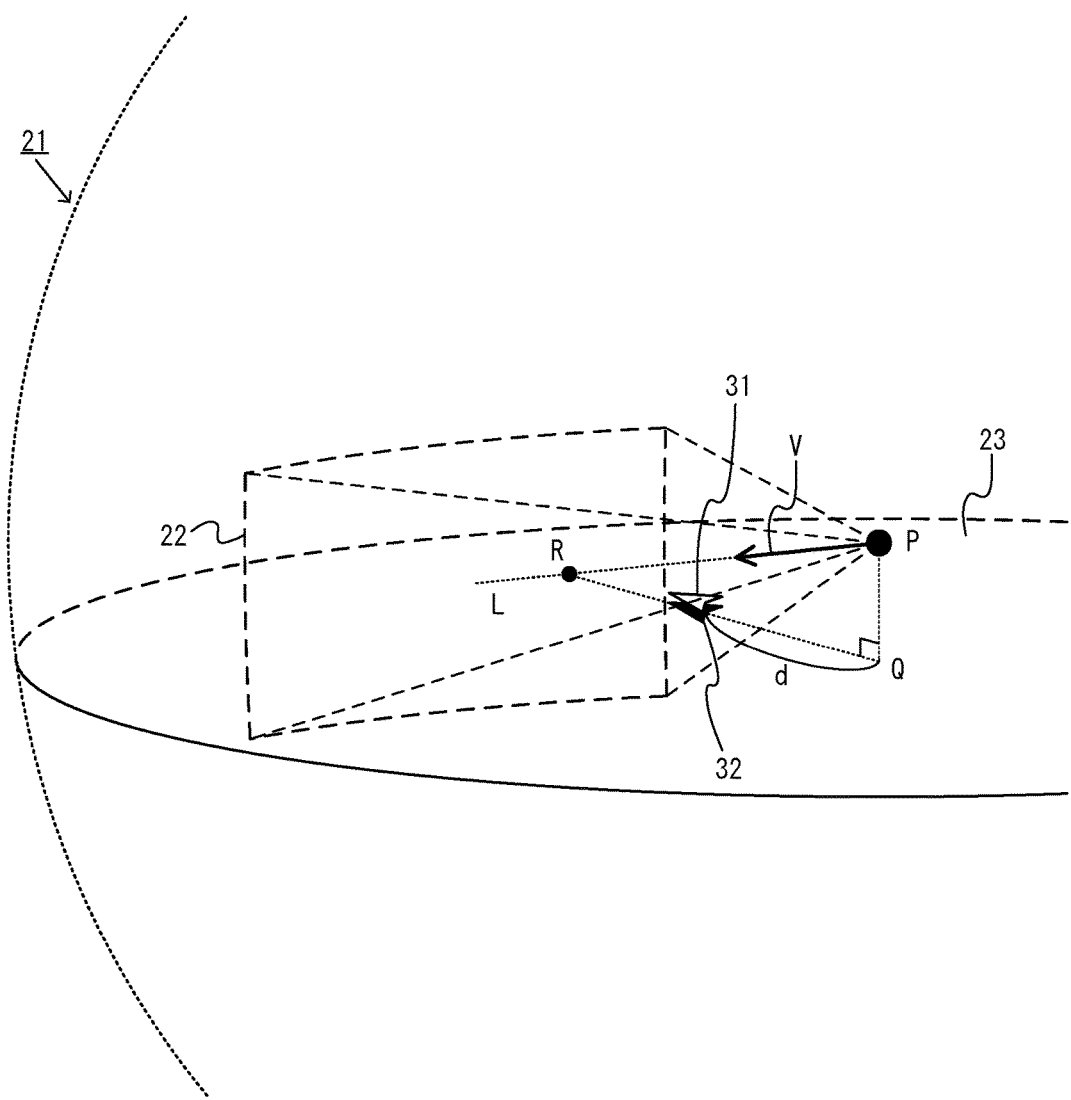
FIG. 12 is a diagram showing an example of the three-dimensional space when the line-of-sight direction becomes close to the horizontal direction.
Figure 13:
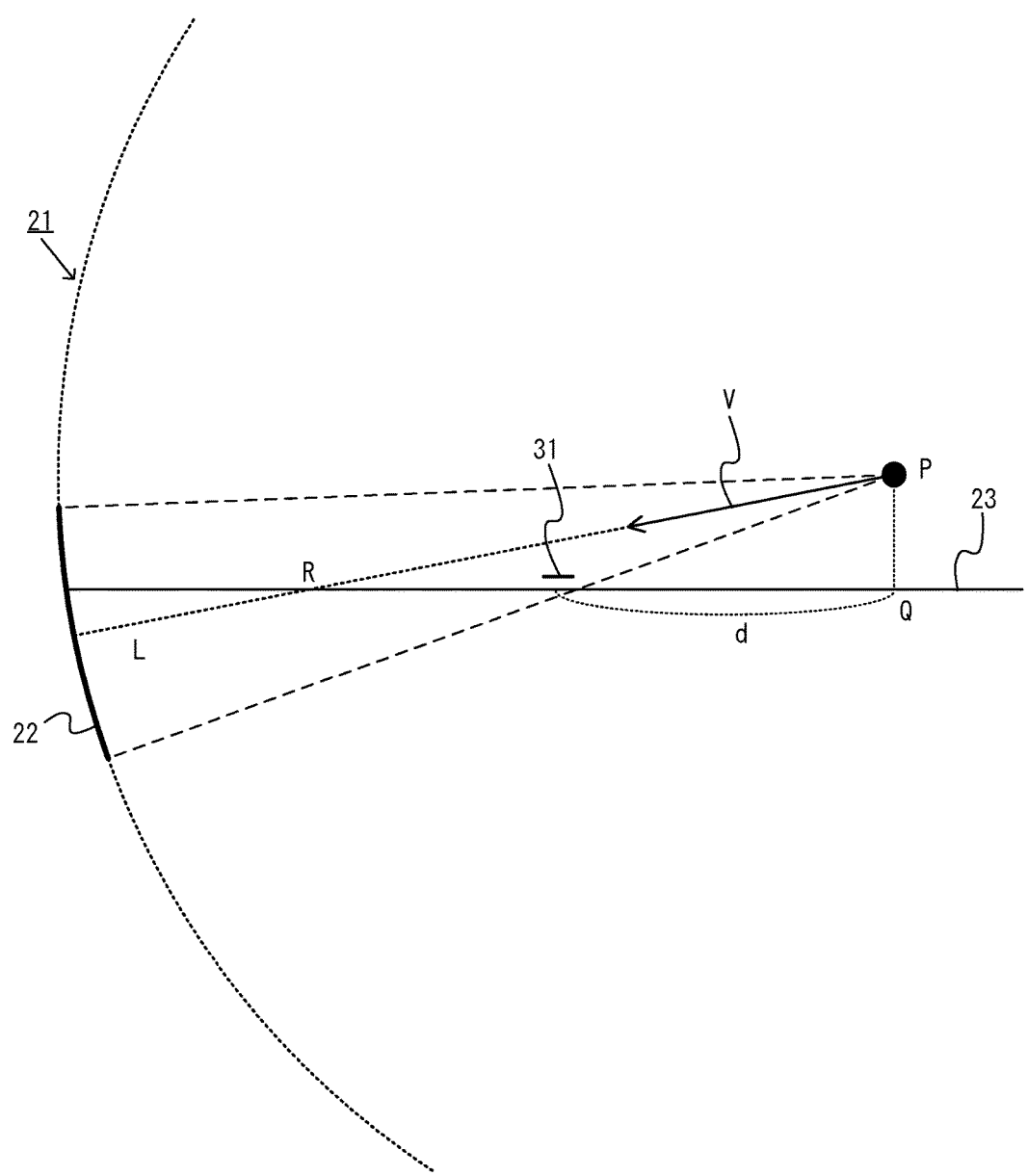
FIG. 13 is a diagram of the example of the three-dimensional space shown in FIG. 12, as seen from a direction parallel to the reference plane.

FIG. 12 is a diagram showing an example of the three-dimensional space when the line-of-sight direction V becomes close to the horizontal direction (see FIG. 7). In addition, FIG. 13 is a diagram of the three-dimensional space shown in FIG. 12, as seen from a direction parallel to the reference plane 23. In the state shown in FIGS. 12 and 13, the line-of-sight direction V is directed more upward than in the state shown in FIGS. 9 and 10 and becomes close to the horizontal direction. As a result, in FIGS. 12 and 13, the line-of-sight direction V is not directed to the arrangement range 34. In this case, in the first control mode, the information processing system 1 arranges the direction object 31 above a position on a straight line connecting the projected position Q and the intersection point R, which position is away from the projected position Q by a distance d (FIGS. 12 and 13). By so doing, the direction object 31 is displayed below the center of the screen so as to move along the ground in accordance with the line-of-sight direction V (see FIG. 7).

Due to the above, in the first control mode, in the case where the line-of-sight direction is changed upward from a state where the direction object 31 is displayed at the center of the screen, the displayed position of the direction object 31 on the screen is initially kept at the center of the screen (FIG. 6). When the direction object 31 reaches the outer periphery of the arrangement range 34, the displayed position is moved toward the lower side of the screen (FIG. 7). Then, the direction object 31 is displayed near the lower edge of the screen. In the present embodiment, when the displayed position of the direction object 31 is moved within a predetermined distance from the lower edge of the screen, the information processing system 1 switches the control mode to the second control mode.

(Switching Between First Control Mode and Second Control Mode)

Here, the case where the displayed position of the direction object 31 is moved within the predetermined distance from the lower edge of the screen is also a case where the line-of-sight direction is directed to the inside of a predetermined determination range on the reference plane 23. FIG. 11 shows an example of the determination range. A determination range 35 is a range of the intersection point R between the line-of-sight direction V (line-of-sight straight line L) and the reference plane 23 when the direction object 31 is arranged within the arrangement range 34 and the displayed position is within the predetermined distance from the lower edge of the screen. Specifically, when the arrangement range 34 is a circular area as shown in FIG. 11, the determination range 35 becomes a circular area larger than the arrangement range 34. It is noted that when the arrangement range 34 is set so as to be relatively large, the determination range 35 may be larger than a circular area defined by the line of intersection between the three-dimensional model 21 and the reference plane 23 (may become a circular area larger than the circular area defined by the line of intersection).

It is possible to perform a determination as to switching between the first control mode and the second control mode, for example, on the basis of whether the line-of-sight direction V is directed to the determination range 35. Specifically, in the present embodiment, the information processing system 1 sets the control mode at the first control mode when the line-of-sight straight line L intersects the determination range 35, and the information processing system 1 sets the control mode at the second control mode when the line-of-sight straight line L does not intersect the determination range 35. In other words, the information processing system 1 sets the control mode at the first control mode when the line-of-sight direction V is directed to the inside of the determination range 35 on the reference plane 23, and the information processing system 1 switches the control mode to the second control mode in accordance with the line-of-sight direction V being deviated from the inside of the determination range 35. Therefore, when the line-of-sight direction V is gradually changed upward, the control mode is switched from the first control mode to the second control mode in accordance with the line-of-sight direction V being not directed to the determination range 35.

It is noted that it is possible to perform a specific process of determining whether the line-of-sight direction V is directed to the determination range 35 (whether the line-of-sight straight line L and the determination range 35 intersect each other), by using an angle of the line-of-sight direction V. For example, in the case where the direction of the line-of-sight direction V that is directed to the reference plane 23 and perpendicular to the reference plane 23 is set as a reference (0°), the information processing system 1 may determine whether to set the control mode at the first control mode, on the basis of whether the angle of the line-of-sight direction V relative to the reference is equal to or less than a predetermined value. As described above, it can also be said that the determination as to switching between the first control mode and the second control mode is performed in accordance with the extent to which the line-of-sight direction V is directed to the reference plane 23 (the above angle).

It is noted that a specific method for determining whether the line-of-sight direction V is directed to the determination range 35 is arbitrary. In the present embodiment, the above determination is performed on the basis of whether the line-of-sight straight line L and the determination range 35 intersect each other. However, the above determination may be performed by another method. For example, in another embodiment, the above determination may be performed by using the displayed position of the direction object 31 on the screen. More specifically, the information processing system 1 may determine whether the line-of-sight direction V is directed to the determination range 35, on the basis of whether the displayed position of the direction object 31 is away from the periphery of the screen by a predetermined distance or longer.

(Second Control Mode)

Figure 14:
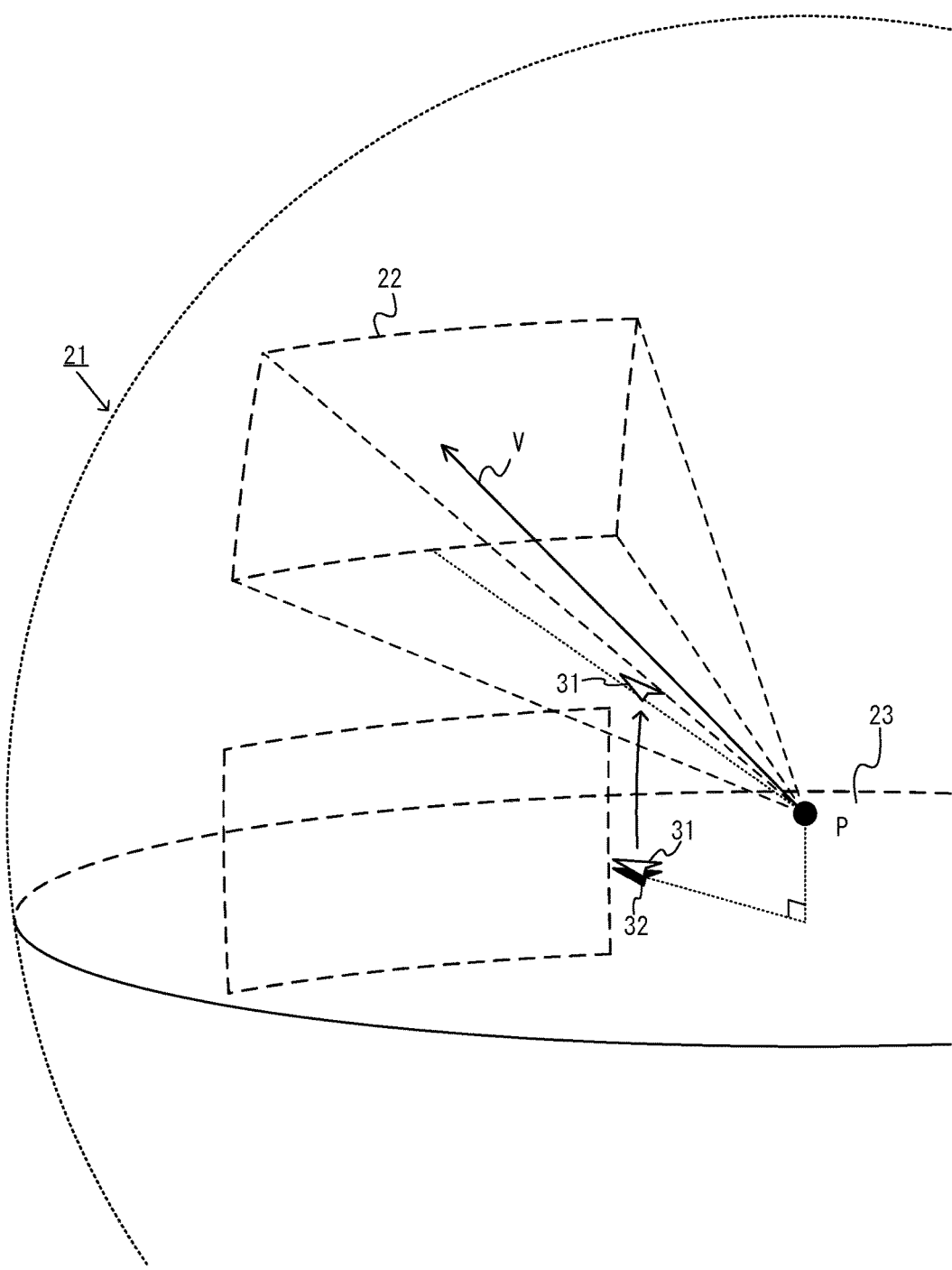
FIG. 14 is a diagram showing an example of the three-dimensional space when the line-of-sight direction is directed upward with respect to the horizontal direction.
Figure 15:
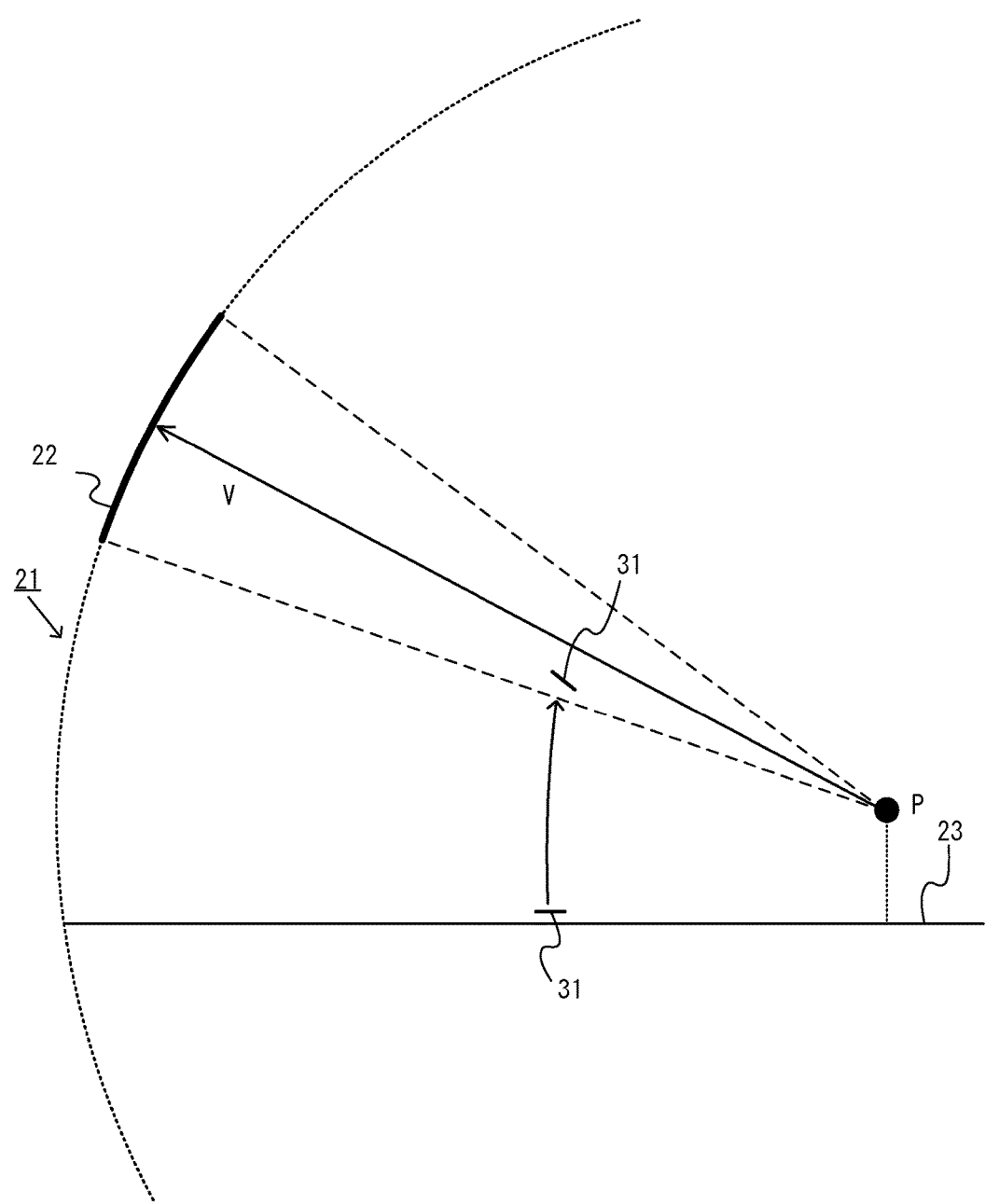
FIG. 15 is a diagram of the example of the three-dimensional space shown in FIG. 14, as seen from a direction parallel to the reference plane.

Next, a method for arranging the direction object 31 in the second control mode will be described. FIG. 14 is a diagram showing an example of the three-dimensional space when the line-of-sight direction V is directed upward with respect to the horizontal direction (see FIG. 8). In addition, FIG. 15 is a diagram of the three-dimensional space shown in FIG. 14, as seen from a direction parallel to the reference plane 23. It is noted that here, it is assumed that the control mode is switched from the first control mode to the second control mode immediately after the state shown in FIG. 12, and positions of the direction object 31 and the area 22, which is the field-of-view range, before and after their change are shown in FIG. 14.

In the second control mode, the information processing system 1 arranges the direction object 31 in accordance with the line-of-sight direction V such that the positional relation between the line-of-sight direction V (line-of-sight straight line L) and the direction object 31 is not changed (see FIGS. 14 and 15). Therefore, in the second control mode, the displayed position of the direction object 31 on the screen is not changed. In addition, in the present embodiment, the direction object 31 is arranged such that the positional relation immediately before the switching of the control mode is kept. Therefore, the direction object 31 is displayed such that its displayed position is not changed from that immediately before the switching of the control mode.

In addition, in the second control mode, the information processing system 1 controls the attitude of the direction object 31 in accordance with the line-of-sight direction V. In the present embodiment, the attitude of the direction object 31 is controlled such that the angle formed between the direction object 31 having a flat surface shape and the line-of-sight direction V is not changed. Specifically, as shown in FIGS. 14 and 15, in accordance with the line-of-sight direction V being directed upward, the attitude is changed such that the direction object 31 is also directed upward. Since the attitude of the direction object 31 is controlled such that the angle formed between the direction object 31 and the line-of-sight direction V is kept as described above, the inclination of the direction object 31 on the display (the inclination of the direction object 31 displayed on the screen) is not changed. Thus, in the second control mode, it is possible to display the direction object 31 such that the direction object 31 is easily visible.

It is noted that when the attitude of the direction object 31 is controlled in the second control mode as described above, the direction object 31 having a flat surface shape is not necessarily parallel to the reference plane 23 as illustrated in FIGS. 14 and 15 in some cases. In other words, in the above cases, there is the possibility that the direction object 31 does not accurately indicate the direction that is parallel to the reference plane 23 and is the direction associated with the direction object 31. Here, the information processing system 1 controls the direction of the direction object 31 such that the direction indicated by the direction object 31 when the direction object 31 is projected onto the reference plane 23 coincides with the direction associated with the direction object 31 (see FIG. 14). In other words, the direction of the direction object 31 is controlled such that, when the direction object 31 (separated from the reference plane 23) is projected onto the reference plane 23, the tip of the arrowhead shape is directed in the direction associated with the direction object 31. According to this, although the direction object 31 does not accurately indicate the direction that should be originally indicated (the direction parallel to the reference plane 23), it is possible to arrange the object 31 such that the object 31 indicates an appropriate direction that is less likely to cause a user's misunderstanding.

As described above, in the present embodiment, when the direction object 31 is about to be outside the field-of-view range in the first control mode, the control mode is switched to the second control mode, and the direction object 31 is arranged such that its position is kept within the field-of-view range. In other words, the information processing system 1 switches the control mode from the first control mode to the second control mode, in order to prevent (at least a part of) the direction object 31 from being outside the field-of-view range due to change of the line-of-sight direction in the first control mode. Therefore, in the present embodiment, also in switching between two types of control modes, namely, the first control mode and the second control mode, it is possible to display the direction object 31 such that the direction object 31 is not outside the field-of-view range. Thus, it is possible to improve the visibility of the direction object 31.

In addition, in the present embodiment, in the first control mode and the second control mode, the direction object 31 is arranged at a position included in the field-of-view range. Therefore, it is possible to reliably display the direction object 31 in each mode.

Furthermore, in the present embodiment, in switching the control mode from the first control mode to the second control mode, the positional relation between the line-of-sight direction V (line-of-sight straight line L) and the direction object 31 is kept between before and after the switching. In other words, in the second control mode, the information processing system 1 arranges the direction object 31 such that the positional relation between the line-of-sight direction V and the direction object 31 is kept as the positional relation in the first control mode immediately before shifting to the second control mode. Therefore, according to the present embodiment, the displayed position of the direction object 31 is kept in switching the control mode from the first control mode to the second control mode, and thus it is possible to reduce a concern that the user loses sight of the direction object 31 at the time of the switching. Thus, it is possible to improve the visibility of the direction object 31.

Moreover, in the present embodiment, in the first control mode, the direction object 31 is arranged such that the attitude of the direction object 31 corresponds to the reference plane 23 (specifically, such that the direction object 31 is substantially parallel to the reference plane 23). Meanwhile, in the second control mode, the direction object 31 is arranged such that the attitude of the direction object 31 corresponds to the line-of-sight direction V (specifically, such that the angle formed between the direction object 31 and the line-of-sight direction V is kept). According to the present embodiment, since the method for controlling the attitude of the direction object 31 is changed between the first control mode and the second control mode as described above, it is possible to display the direction object 31 in each control mode such that the direction object 31 is easily visible.

(Case where a Plurality of Direction Objects 31 are Arranged)

In the example described above with reference to FIGS. 9 to 15, the single direction object 31 is arranged. Also in a case where a plurality of direction objects are arranged, it is possible to arrange the direction objects by the same method as in the above example. It is noted that in the case where a plurality of direction objects are arranged, for example, each direction object may be arranged such that the center position of the plurality of direction objects is the position of the single direction object 31 in the above example. In this case, for example, each direction object may be arranged at a position away from the center position by a predetermined distance in the direction associated with the direction object.

(3-3:Viewpoint Movement Process)

As described above, in the present embodiment, panoramic images at a plurality of points in the real world are prepared. Specifically, the information processing system 1 has stored therein map data representing the real world, and the map data includes point information (node) indicating the plurality of points and connection information (link) indicating connection between the points. One panoramic image is associated with each piece of the point information. When a display process of a panoramic image is performed, one piece of the point information is selected, and the display process is performed using the panoramic image associated with the selected point information.

Figure 16:
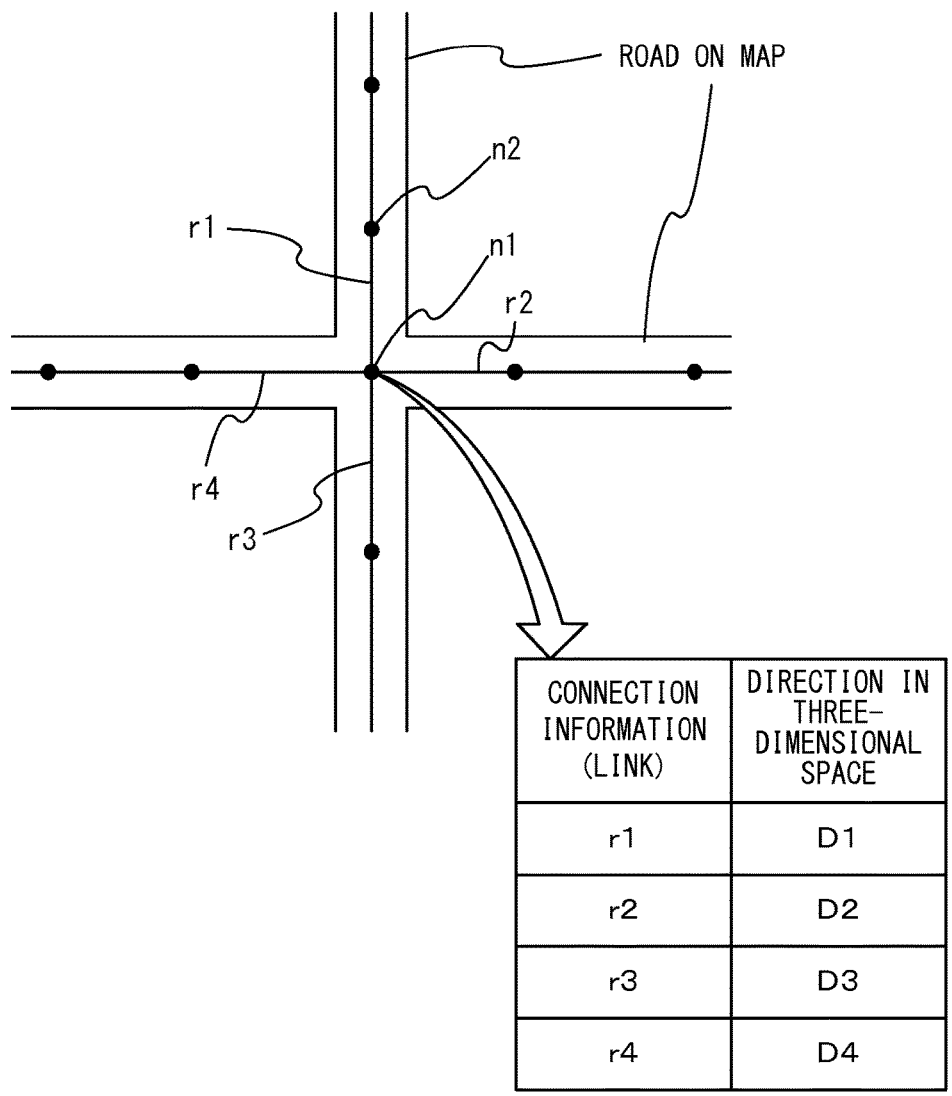
FIG. 16 is a diagram showing an example of the configuration of map data.

A direction in the three-dimensional space is associated with the point information for each link connected to the point. FIG. 16 is a diagram showing an example of the configuration of the map data. Giving a description with FIG. 16 as an example, four links r1 to r4 are connected to a point (node) n1. In addition, at the node n1, directions D1 to D4 in the three-dimensional space are associated with the links r1 to r4, respectively, (see FIG. 16).

In addition, in the present embodiment, the direction objects 31 are associated with the links included in the map data. Specifically, one direction object 31 is associated with one of the directions in the three-dimensional space which are associated with the connection information (links). For example, at the node n, four direction objects 31 are associated with the directions D1 to D4 associated with the links r1 to r4, respectively. In other words, when a panoramic image at the node n1 is displayed, the four direction objects 31 indicating the directions D1 to D4 in the three-dimensional space for the links r1 to r4 are arranged and displayed.

When a panoramic image at a certain point is displayed, if a direction in the three-dimensional space is designated, the information processing system 1 changes the point from the certain point to a point connected via the link associated with the designated direction. Then, the information processing system 1 displays a panoramic image associated with the point after the change. Giving a description with FIG. 16 as an example, when the panoramic image at the node n1 is displayed, if the direction associated with the link r1 is designated, the point is moved from the node n1 to a node n2, and a panoramic image at the node n2 is displayed. By the process of changing the point as described above, it is possible to change (move) the viewpoint for the panoramic image and display the panoramic image. Thus, for the user, the viewpoint in the real world displayed on the screen is seen as if moving.

In the present embodiment, the information processing system 1 receives an input of designating any direction object 31, as an input of moving the point, namely, as an input of designating a direction in the three-dimensional space. More specifically, the information processing system 1 detects, with the touch panel 17, an input (touch input) on any direction object 31 displayed on the LCD 14 of the terminal apparatus 3, and determines that the direction associated with the direction object 31 on which the input has been performed is designated. Therefore, the user is allowed to move the viewpoint for the panoramic image by performing an input of touching any direction object 31.

In addition, in the present embodiment, as an input of designating any direction object 31, it is possible perform an input of designating a currently selected direction object 31 by pressing a predetermined operation button 15. Here, the currently selected direction object 31 is a direction object 31 indicating a direction close to the forward direction (line-of-sight direction), among one or more displayed direction objects 31. For example, in FIG. 6, the direction object 31*a* among the four direction objects 31*a* to 31*d* is the currently selected direction object 31. A specific method for determining the currently selected direction object 31 is arbitrary, but, in the present embodiment, a direction object 31 whose angle with a direction obtained by projecting the line-of-sight direction onto the reference plane 23 is equal to or less than a predetermined angle and which indicates a direction closest to this direction is selected. Therefore, when the currently selected direction object 31 is set, the user is allowed to move the viewpoint for the panoramic image by pressing the above predetermined operation button 15.

As described above, in the present embodiment, the information processing system 1 receives an input of designating any direction object 31 displayed on the LCD 14. Then, in accordance with reception of the input of designating any direction object 31, the information processing system 1 changes the image (the panoramic image) of the three-dimensional space such that the position of the viewpoint in the real world is moved in the direction associated with the designated direction object 31, and displays the image on the LCD 14. According to this, the user is allowed to move the viewpoint in the displayed real world in accordance with an input of designating any direction object 31, and thus is allowed to move the viewpoint with a simple operation. In addition, in the present embodiment, since the direction object 31 indicates the direction associated with the moving direction, it is possible to present the moving direction of the viewpoint in a more easy-to-understand manner to the user.

It is noted that in the present embodiment, the information processing system 1 arranges the above currently selected direction object 31 such that its display form (arranged position, color, shape, etc.) is different from those of the direction objects 31 that are not currently selected (see FIGS. 6 to 8). Specifically, in the present embodiment, as shown in FIGS. 6 to 8, the currently selected direction object 31*a* is arranged at a height different from those of the direction objects 31*b* to 31*d* that are not currently selected. In addition, the currently selected direction object 31*a* is rendered in a color (represented by diagonal lines in the drawing) different from those of the direction objects 31*b* to 31*d* that are not currently selected. Since the display form of the direction object 31 is made different depending on whether the direction object 31 is currently selected as described above, it is possible to easily cause the user to recognize the currently selected direction object 31.

As described above, in the present embodiment, the reference distance, which is the distance by which the direction object 31 is spaced apart from the reference plane 23, is different depending on whether the direction object 31 is currently selected. In other words, the reference distance may not be fixed (may be fixed) at one kind of a value, or may be variable in a range where it can be said that the direction object 31 moves along the reference plane 23.

[4. Details of Display Control Process]

Figure 17:
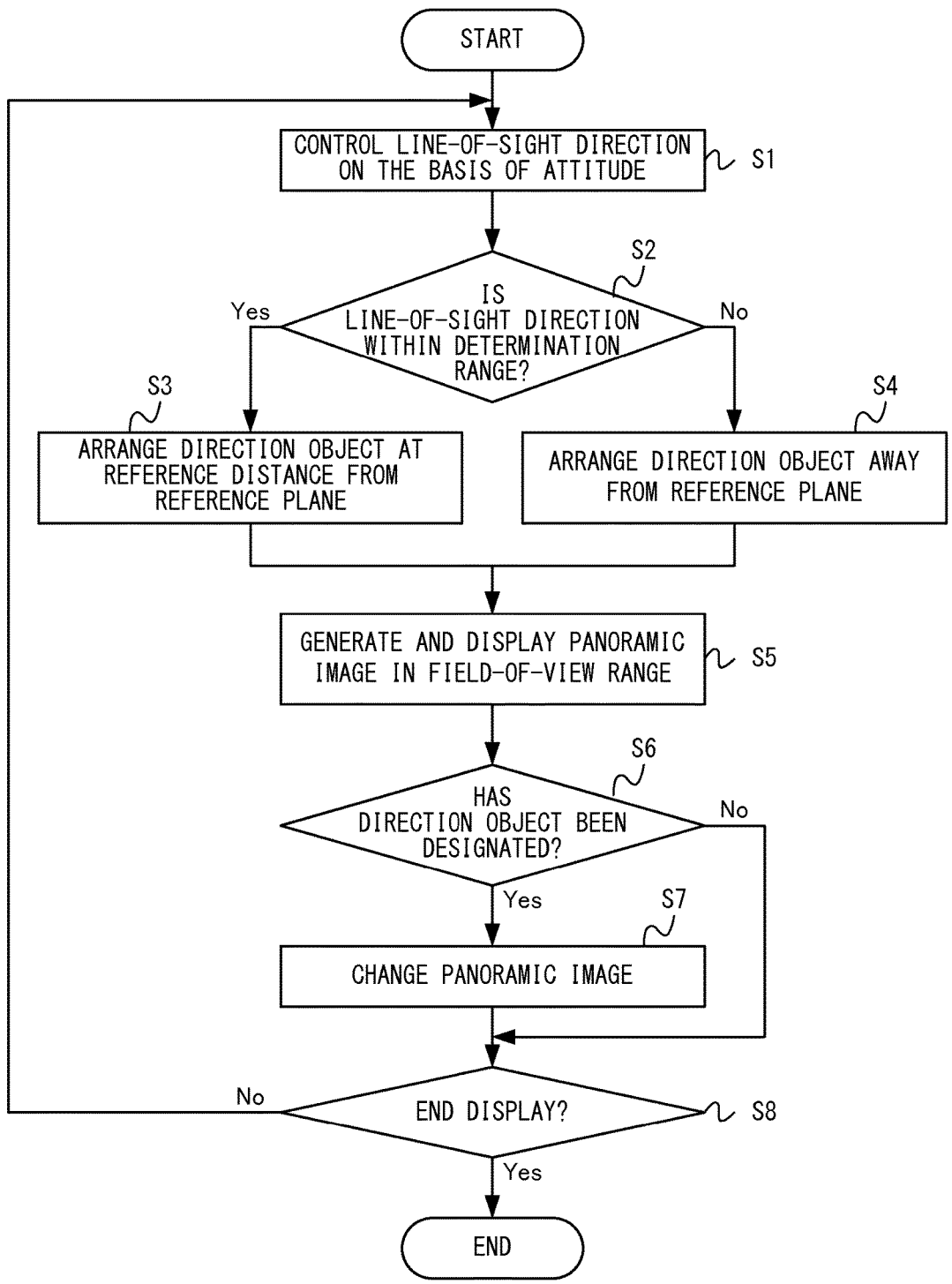
FIG. 17 is a flowchart showing an example of a display control process performed by a non-limiting information processing apparatus (CPU) in the embodiment.

Hereinafter, a specific example of the display control process performed by the information processing system 1 (information processing apparatus 2) in the present embodiment will be described. FIG. 17 is a flowchart showing an example of a display control process performed by the information processing apparatus 2 (CPU 11) in the present embodiment. In the present embodiment, a series of processes shown in FIG. 17 is performed by the CPU 11 executing the display control program stored in the program storage section 13.

It is noted that the timing at which the display control process shown in FIG. 17 is started is arbitrary. In the present embodiment, execution of the display control program is started in accordance with the user performing an instruction for reproducing a panoramic image. At that time, a part or the entirety of the display control program is loaded into the memory 12 at appropriate timing, and executed by the CPU 11. By so doing, the series of processes shown in FIG. 17 is started. It is noted that the display control program has been previously stored in the program storage section 13 within the information processing apparatus 2. However, in another embodiment, the display control program may be obtained by the information processing apparatus 2 from an attachable/detachable storage medium and stored into the memory 12, or may be obtained from another apparatus via a network such as the Internet and stored into the memory 12.

It is noted that a process in each step in the flowchart shown in FIG. 17 is merely an example, and as long as the same result is obtained, the order of the processes in the respective steps may be changed, or another process may be performed in addition to (or instead of) the process in each step. In addition, in the present embodiment, the CPU 11 performs the process in each step in the above flowchart. However, a processor or a dedicated circuit other than the CPU 11 may perform the processes at some of the steps in the above flowchart.

In addition, in the present embodiment, the CPU 11 obtains the above-described map data prior to starting the display control process shown in FIG. 17. The CPU 11 may obtain the map data from a storage section within the information processing apparatus 2, from a storage medium that is attachable to and detachable from the information processing apparatus 2, or from another apparatus via a network such as the Internet. In addition, the map data obtained prior to start of the display control process may be only data regarding some points (e.g., a point associated with a panoramic image that is initially displayed). The obtained map data is stored into the memory 12.

In step S1 of the display control process, the CPU 11 controls the line-of-sight direction in the three-dimensional space. In the present embodiment, the CPU 11 calculates the line-of-sight direction on the basis of the attitude of the terminal apparatus 3 according to the method described in the above "[2. Display of panoramic image]". Then, the CPU 11 stores data indicating the calculated line-of-sight direction, into the memory 12. Next to the step S1, a process in step S2 is performed.

In step S2, the CPU 11 determines whether the line-of-sight direction is directed to the inside of the above-described determination range. In the present embodiment, the determination process in step S2 is performed according to the method described in the above "(Switching between first control mode and second control mode)". It is noted that in the present embodiment, it is assumed that (data indicating) the determination range is set in the display control program. The CPU 11 reads the data indicating the determination range and the above data indicating the line-of-sight direction, and performs the above determination using the read data. When a result of the determination in step S2 is positive, a process in step S3 is performed. On the other hand, when the result of the determination in step S2 is negative, a process in step S4 is performed.

In step S3, the CPU 11 arranges the direction object 31 in the first control mode. In other words, according to the method described in the above "(First control mode)", the CPU 11 arranges the direction object 31 at a position away from the reference plane by the reference distance. In addition, in step S3, the CPU 11 arranges the shadow object 32 and the linear object 33. Next to step S3, a process in step S5 described later is performed.

Meanwhile, in step S4, the CPU 11 arranges the direction object 31 in the second control mode. In other words, according to the method described in the above "(Second control mode)", the CPU 11 arranges the direction object 31 such that the direction object 31 is away from the reference plane by a distance longer than the reference distance. In addition, in step S4, the CPU 11 arranges the shadow object 32 and the linear object 33. It is noted that in the second control mode, the shadow object 32 and the linear object 33 may not be arranged. Next to step S4, the process in step S5 is performed.

It is noted that in each of the processes in steps S3 and S4, the CPU 11 reads the above map data and the data indicating the line-of-sight direction, from the memory 12, and arranges the direction object 31 by using the read data. In addition, in each of the processes in steps S3 and S4, as described in the above "(Case where a plurality of direction objects 31 are arranged)", a plurality of direction objects 31 are arranged according to need. In addition, as described in the above "(3-3:Viewpoint movement process)", the CPU 11 selects the direction object 31 indicating a direction close to the forward direction (line-of-sight direction), from among the arranged direction objects 31, and arranges the selected direction object 31 in a display form different from those of the direction objects 31 that are not selected.

In step S5, the CPU 11 generates an image in a field-of-view range, determined on the basis of the line-of-sight direction, of the three-dimensional space, and displays the generated image on the LCD 14. In the present embodiment, the CPU 11 generates the image in the field-of-view range according to the method described in the above "(Method for displaying panoramic image)". Then, the CPU 11 outputs (transmits) the generated image to the terminal apparatus 3 in order that the generated image is displayed on the LCD 14. The terminal apparatus 3 receives the generated image and displays the generated image on the LCD 14. By so doing, a part of the panoramic image is displayed on the LCD 14. In this case, since the direction object 31 is arranged in the three-dimensional space, an image of the direction object 31 is displayed in addition to the panoramic image. Next to step S5, a process in step S6 is performed.

In step S6, the CPU 11 determines whether the direction object 31 has been designated. In other words, as described in the above "(3-3:Viewpoint movement process)", the CPU 11 determines whether a touch input has been performed on the direction object 31, or whether the predetermined operation button 15 has been operated when there is a currently selected direction object 31. The CPU 11 obtains operation data from the terminal apparatus 3 and performs the above determination by using the obtained operation data. When a result of the determination in step S6 is positive, a process in step S7 is performed. On the other hand, when the result of the determination in step S6 is negative, the process in step S7 is skipped and a process in step S8 described later is performed.

In step S7, the CPU 11 changes the panoramic image such that the position of the viewpoint in the real world is moved. In other words, according to the method described in the above "(3-3:Viewpoint movement process)", the CPU 11 changes the panoramic image used for display. It is noted that the panoramic image may be obtained from another apparatus via a network such as the Internet, and in this case, the panoramic image after the change may be obtained at the timing of step S7. When the process in step S7 is performed, the panoramic image to be displayed on the LCD 14 is changed by the display process in step S5 that is performed next time. Next to step S7, the process in step S8 is performed.

In step S8, the CPU 11 determines whether to end the display process of the panoramic image. A specific method for this determination is arbitrary. For example, when an instruction for stopping the display is performed by the user, the CPU 11 determines to end the display process, and when there is not such an instruction by the user, the CPU 11 determines to not end the display process. When a result of the determination in step S8 is negative, the process in step S1 is performed again. Thereafter, the processes in steps S1 to S8 are repeatedly performed until it is determined in step S8 to end the display process. On the other hand, when the result of the determination in step S8 is positive, the CPU 11 ends the display control process shown in FIG. 17.

[5. Modifications]

(Modifications Regarding Another Control Mode)

In the above embodiment, the case where the information processing system 1 arranges the direction objects 31 in either the first control mode or the second control mode has been described as an example. Here, in another embodiment, the control mode regarding the arrangement of the direction objects 31 may include another control mode other than the first control mode and the second control mode. In another embodiment, a third control mode in which no direction object 31 is arranged may be included. For example, when the line-of-sight direction is close to the vertically upward direction, the information processing system 1 may set the control mode at the third control mode instead of the second control mode.

(Modifications Regarding Displayed Image)

In the above embodiment, the case where the panoramic image representing the real world is displayed has been described as an example. Here, the displayed image of the three-dimensional space is not limited to an image representing the real world, but may be an image representing a virtual world. It is noted that the "image representing a virtual world" may be an image (CG image etc.) whose entirety represents a virtual space, or may be an image that includes, in a part thereof, an image representing the real space. For example, the "image representing a virtual world" may be an image obtained by synthesizing an image of the real space and an image of a virtual space using an augmented reality technique. In addition, the information processing system 1 may reproduce a panoramic moving image by repeatedly performing a process of displaying a panoramic image on the display device.

Furthermore, the displayed image is not limited to (a part of) a panoramic image. In other words, the information processing system 1 is not limited to one that displays an image of a three-dimensional space using a panoramic image, but may be one that displays an image of any three-dimensional space on the display device. For example, in another embodiment, the information processing system 1 may create a virtual world by a geographical object and the like in a three-dimensional space, and may generate and display an image of the created virtual world by using a virtual camera. It is noted that in this case, when a ground object is set in the three-dimensional space, a plane for the ground object may be set as the above reference plane. As described above, the display control method in the above embodiment is also applicable to a game system and the like that create a virtual world (game world) in a virtual three-dimensional space and displays an image of the virtual world. In this case, the direction object may indicate a predetermined direction in the three-dimensional space (e.g., a direction in which a game character should move).

(Modifications Regarding Arranged Object)

In the above embodiment, the case where the direction object 31 indicating a direction in the three-dimensional space (more specifically, a direction on the reference plane) is arranged as an object to be arranged in the three-dimensional space has been described as an example. It is noted that the object to be arranged in the three-dimensional space is not limited to the direction object, but may be any object. For example, in another embodiment, the object may not indicate a direction, and may have only the above-described function as an instruction image for performing an instruction for moving the viewpoint. In addition, the direction object 31 is not limited to one indicating the direction of a road, and for example, may be one indicating a direction defined in the real world or a virtual world (a bearing, for example, the north direction in the real world).

The systems, devices and apparatuses described herein may include one or more processors, which may be located in one place or distributed in a variety of places communicating via one or more networks. Such processor(s) can, for example, use conventional 3D graphics transformations, virtual camera and other techniques to provide appropriate images for display. By way of example and without limitation, the processors can be any of: a processor that is part of or is a separate component co-located with the stationary display and which communicates remotely (e.g., wirelessly) with the movable display; or a processor that is part of or is a separate component co-located with the movable display and communicates remotely (e.g., wirelessly) with the stationary display or associated equipment; or a distributed processing arrangement some of which is contained within the movable display housing and some of which is co-located with the stationary display, the distributed portions communicating together via a connection such as a wireless or wired network; or a processor(s) located remotely (e.g., in the cloud) from both the stationary and movable displays and communicating with each of them via one or more network connections; or any combination or variation of the above.

The processors can be implemented using one or more general-purpose processors, one or more specialized graphics processors, or combinations of these. These may be supplemented by specifically-designed ASICs (application specific integrated circuits) and/or logic circuitry. In the case of a distributed processor architecture or arrangement, appropriate data exchange and transmission protocols are used to provide low latency and maintain interactivity, as will be understood by those skilled in the art.

Similarly, program instructions, data and other information for implementing the systems and methods described herein may be stored in one or more on-board and/or removable memory devices. Multiple memory devices may be part of the same device or different devices, which are co-located or remotely located with respect to each other.

As described above, for the purpose of: improving in the visibility of an object displayed so as to be superimposed on an image representing a three-dimensional space; and the like, it is possible use the present embodiment, for example, for an information processing system displaying a panoramic image, a game system displaying an image of a game world, and the like.

While certain example systems, methods, devices and apparatuses have been described herein, it is to be understood that the appended claims are not to be limited to the systems, methods, devices and apparatuses disclosed, but on the contrary, are intended to cover various modifications and equivalent arrangements included within the spirit and scope of the appended claims.

What is claimed is:

1. An apparatus, comprising:
   a processor;
   a display device; and
   a non-transitory computer-readable storage medium having instructions stored thereupon which, when executed by the processor, cause the apparatus to:
      display, on the display device, a panoramic image in a field-of-view range according to a line-of-sight direction of a virtual camera;
      display an object on the panoramic image according to the line-of-sight direction of the virtual camera, wherein the object is displayed based at least in part on control modes for arranging the object, the control modes comprising:
         a first control mode corresponding to when the line-of-sight direction is directed to a range associated with a reference plane of a ground, wherein in the first control mode, the object is displayed at a reference distance from the reference plane of the ground regardless of the line-of-sight direction; and
         a second control mode corresponding to when the line-of-sight direction is not directed to the range associated with the reference plane of the ground, wherein in the second mode, the object is displayed at a location of the object relative to the line-of-sight direction in the first control mode when a transition from the first control mode to the second control mode occurs;
      determine that the apparatus is operating in the first control mode;
      display, based at least in part on the apparatus operating in the first control mode, the object at the reference distance;
      determine that the line-of-sight direction is not directed to the range associated with the reference plane of the ground;

transition, based at least in part on the line-of-sight direction not being directed to the range associated with the reference plane of the ground, the apparatus from the first control mode to the second control mode; and display, based at least in part on the transition, the object at the location of the object relative to the line-of-sight direction in the first control mode when the transition occurred.

2. A display control system comprising:

a processor; and a non-transitory computer-readable storage medium having instructions stored thereupon which, when executed by the processor, cause the processor to:

arrange an object in a three-dimensional space representing a real world or a virtual world based at least in part on a line-of-sight direction determined in the three-dimensional space;

display an image in a field-of-view range, based at least in part on the line-of-sight direction, of the three-dimensional space on a display device, wherein the object is arranged based at least in part on control modes for arranging the object, the control modes comprising:

a first control mode corresponding to when the line-of-sight direction is directed to a predetermined range on a reference plane, the object displayed, when in the first control mode, at a reference distance from the reference plane regardless of change to the line-of-sight direction; and a second control mode corresponding to when the line-of-sight direction is not directed to the predetermined range on the reference plane, the object displayed, when in the second control mode, at a location of the object relative to the line-of-sight direction when a transition from the first control mode to the second control mode occurs;

determine that the apparatus is operating in the first control mode;

display, based at least in part on the apparatus operating in the first control mode, the object at the reference distance;

determine that the line-of-sight direction is not directed to the predetermined range on the reference plane;

transition from the first control mode to the second control mode based at least in part on the line-of-sight direction not being directed to the predetermined range on the reference plane; and display, based at least in part on the transition, the object at the location of the object when the transition occurred.

3. The display control system according to claim 2, wherein the object is arranged, in the first control mode, such that the object is kept at the reference distance from the reference plane, regardless of change of the line-of-sight direction.

4. The display control system according to claim 2, wherein the transition from the first control mode to the second control mode causes the object to be inside the field-of-view range as a result of a change of the line-of-sight direction from the first control mode.

5. The display control system according to claim 2, wherein the object indicates a direction in the real world or the virtual world represented by the three-dimensional space.

6. The display control system according to claim 2, wherein the non-transitory computer-readable storage medium has further instructions stored thereupon to:

receive input designating the object;

change, based at least in part on the input designating the object, the image of the three-dimensional space such that a position of a viewpoint in the real world or the virtual world is moved in a direction associated with the object; and display the image, as changed, on the display device.

7. The display control system according to claim 2, wherein, in the second control mode, the object is included in the field-of-view range based at least in part on the line-of-sight direction.

8. The display control system according to claim 2, wherein:

in the first control mode, the object is arranged such that an attitude of the object corresponds to the reference plane; and in the second control mode, the object is arranged such that the attitude of the object corresponds to the line-of-sight direction.

9. The display control system according to claim 2, wherein in the first control mode, the object is configured to move along the reference plane in accordance with the line-of-sight direction.

10. The display control system according to claim 9, wherein in the first control mode, the object is arranged at a position included in the field-of-view range based at least on the line-of-sight direction.

11. The display control system according to claim 2, wherein the transition occurs based at least in part on a deviation of the line-of-sight direction from inside the predetermined range on the reference plane.

12. The display control system according to claim 2, wherein the transition occurs based at least in part on an extent to which the line-of-sight direction is directed to the reference plane.

13. The display control system according to claim 2, wherein the reference plane corresponds to a ground in the real world or the virtual world represented by the three-dimensional space.

14. The display control system according to claim 2, further comprising:

an input device; and wherein the non-transitory computer-readable storage medium has further instructions stored thereupon to control the line-of-sight direction in accordance with an attitude of the input device.

15. The display control system of claim 2, wherein the control modes further comprise a third control mode in which the object is not displayed, and wherein the non-transitory computer-readable storage medium has further instructions stored thereupon to transition to the third control mode when the line-of-sight direction comprises a vertically upward direction.

16. The display control system of claim 2, wherein the reference plane corresponds to one or more streets associated with a ground, the first control mode corresponding to a first instance where the line-of-sight direction includes the one or more streets, the second control mode corresponding to a second instance where the one or more streets are absent from the line-of-sight direction.

17. A non-transitory computer-readable storage medium having computer-executable instructions stored thereupon which, when executed by a computer, cause the computer to:

arrange an object in a three-dimensional space based at least in part on a line-of-sight within the three-dimensional space;
display, on a display device, an image in a field-of-view range, the field-of-view range based at least in part on the line-of-sight within the three-dimensional space, wherein the object is arranged based at least in part on control modes for arranging the object, the control modes comprising:
  a first control mode corresponding to the line-of-sight being directed to a range associated with a reference plane, wherein in the first control mode, the object is displayed at a reference distance from the reference plane regardless of the line-of-sight; and
  a second control mode corresponding to the line-of-sight not being directed to the range associated with the reference plane, wherein in the second control mode, the object is displayed at a location of the object relative to the line-of-sight when a transition from the first control mode to the second control mode occurs;
determine that the apparatus is operating in the first control mode;
display, based at least in part on the apparatus operating in the first control mode, the object at the reference distance;
determine that the line-of-sight is not within the range associated with the reference plane;
transition, based at least in part on the line-of-sight not being within the range associated with the reference plane, the apparatus from the first control mode to the second control mode; and
display, based at least in part on the transition, the object at the location of the object when the transition occurs.

18. The non-transitory computer-readable storage medium of claim 17, wherein the control modes further comprise a third control mode in which the object is not displayed, and wherein the non-transitory computer-readable storage medium has further instructions stored thereupon to transition to the third control mode when the line-of-sight comprises a vertically upward direction.

19. A method for displaying an image of a three-dimensional space representing a real world or a virtual world, the method comprising:
arranging an object in the three-dimensional space based at least in part on a line-of-sight within the three-dimensional space;
displaying an image on a display device in a field-of-view range of the three-dimensional space, the field-of-view range based at least in part on the line-of-sight, wherein the object is arranged based at least in part on control modes for arranging the object, the control modes comprising:
  a first control mode corresponding to when the line-of-sight is directed within a predetermined range of a reference plane of a ground, the object being displayed, in the first control mode, at a reference distance from the reference plane regardless of the line-of-sight; and
  a second control mode corresponding to when the line-of-sight is not directed within the predetermined range of the reference plane of the ground, the object being displayed, in the second control mode, at a location of the object relative to the line-of-sight when a transition from the first control mode to the second control mode occurs;
determine that the apparatus is operating in the first control mode;
display, based at least in part on the apparatus operating in the first control mode, the object at the reference distance;
determine that the line-of-sight is not being directed within the predetermined range of the reference plane of the ground;
transition, based at least in part on line-of-sight not being directed within the predetermined range of the reference plane of the ground, the apparatus from the first control mode to the second control mode; and
display, based at least in part on the transition, the object at the location of the object when the transition occurs.

* * * * *